United States Patent
Pan et al.

(10) Patent No.: US 12,476,493 B2
(45) Date of Patent: Nov. 18, 2025

(54) REMOTE WIRELESS CHARGING TRANSMIT END, RECEIVE END, AND SYSTEM

(71) Applicant: Huawei Digital Power Technologies Co., Ltd., Shenzhen (CN)

(72) Inventors: Ning Pan, Shenzhen (CN); Zhixia Du, Shenzhen (CN); Bing Cai, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 920 days.

(21) Appl. No.: 17/693,831

(22) Filed: Mar. 14, 2022

(65) Prior Publication Data
US 2022/0209583 A1    Jun. 30, 2022

Related U.S. Application Data

(63) Continuation of application No. PCT/CN2020/087773, filed on Apr. 29, 2020.

(51) Int. Cl.
*H02J 7/00* (2006.01)
*H02J 7/14* (2006.01)
(Continued)

(52) U.S. Cl.
CPC .............. *H02J 50/20* (2016.02); *H02J 50/80* (2016.02)

(58) Field of Classification Search
CPC .......... H02J 50/50; H02J 50/502; H02J 50/80; H02J 50/90; H02J 50/402; H02J 50/20; H02J 50/23
(Continued)

(56) References Cited

U.S. PATENT DOCUMENTS

| 5,991,279 | A  | * | 11/1999 | Haugli | ..... | H04B 7/216 |
|           |    |   |         |        |       | 370/320 |
| 8,099,140 | B2 | * | 1/2012  | Arai   | ..... | H01Q 1/243 |
|           |    |   |         |        |       | 455/343.1 |

(Continued)

FOREIGN PATENT DOCUMENTS

| CN | 101247133 A | 8/2008 |
| CN | 103748763 A | 4/2014 |

(Continued)

OTHER PUBLICATIONS

Nuno Borges Carvalho et al., "Wireless Power Transmission:RandD Activities Within Europe", IEEE Transactions on Microwave Theory and Techniques, vol. 62, No. 4, Apr. 2014, Total 15 Pages.

*Primary Examiner* — Alexis B Pacheco
(74) *Attorney, Agent, or Firm* — WOMBLE BOND DICKINSON (US) LLP

(57) ABSTRACT

A remote wireless charging transmit end is configured to wirelessly charge a receive end. The transmit end includes a transmit end processor, a fundamental frequency-radio frequency conversion unit, and a transmit end antenna. The transmit end processor is configured to generate a composite signal based on a control signal and a power signal, and send the composite signal to the fundamental frequency-radio frequency conversion unit. The control signal is used to control a working status of the receive end, and the power signal is used to charge the receive end. The fundamental frequency-radio frequency conversion unit is configured to convert the composite signal into a radio frequency signal, and send the radio frequency signal to the transmit end antenna. The transmit end antenna is configured to transmit the radio frequency signal corresponding to the composite signal.

20 Claims, 19 Drawing Sheets

(51) Int. Cl.
*H02J 50/20* (2016.01)
*H02J 50/80* (2016.01)

(58) Field of Classification Search
USPC ........................................... 320/132
See application file for complete search history.

(56) References Cited

U.S. PATENT DOCUMENTS

| | | | | |
|---|---|---|---|---|
| 8,447,234 | B2* | 5/2013 | Cook | H02J 50/23 |
| | | | | 455/571 |
| 9,143,009 | B2* | 9/2015 | Fitzgibbon | H02J 50/402 |
| 9,490,912 | B2* | 11/2016 | Hyde | H04B 10/807 |
| 9,824,815 | B2* | 11/2017 | Leabman | H02J 50/80 |
| 9,906,065 | B2* | 2/2018 | Leabman | H02J 50/90 |
| 9,912,199 | B2* | 3/2018 | Leabman | H02J 50/20 |
| 10,170,917 | B1 | 1/2019 | Bell et al. | |
| 2004/0085785 | A1* | 5/2004 | Taimela | H02M 1/4258 |
| | | | | 363/37 |
| 2004/0142733 | A1* | 7/2004 | Parise | B60L 53/11 |
| | | | | 455/572 |
| 2006/0113955 | A1* | 6/2006 | Nunally | H02J 50/20 |
| | | | | 320/108 |
| 2007/0081585 | A1 | 4/2007 | Suematsu et al. | |
| 2010/0068998 | A1* | 3/2010 | Zyambo | H02J 50/12 |
| | | | | 455/66.1 |
| 2012/0091799 | A1* | 4/2012 | Rofougaran | H02J 50/20 |
| | | | | 307/29 |
| 2016/0006264 | A1* | 1/2016 | Alperin | H04W 52/0216 |
| | | | | 307/104 |
| 2016/0013656 | A1* | 1/2016 | Bell | H02J 50/90 |
| | | | | 307/104 |
| 2016/0285518 | A1 | 9/2016 | Gong et al. | |
| 2016/0301240 | A1* | 10/2016 | Zeine | H02J 50/20 |
| 2019/0131827 | A1* | 5/2019 | Johnston | H04B 5/79 |
| 2020/0091602 | A1* | 3/2020 | Murata | H02J 50/90 |
| 2021/0249912 | A1* | 8/2021 | Glover | H02J 50/40 |

FOREIGN PATENT DOCUMENTS

| | | |
|---|---|---|
| CN | 204190475 U | 3/2015 |
| CN | 104734832 A | 6/2015 |
| CN | 105162484 A | 12/2015 |
| CN | 105990914 A | 10/2016 |
| CN | 107846080 A | 3/2018 |
| CN | 109756035 A | 5/2019 |
| CN | 110350676 A | 10/2019 |
| CN | 110768393 A | 2/2020 |
| JP | 2010068632 A | 3/2010 |
| JP | 2016181953 A | 10/2016 |
| JP | 2018506252 A | 3/2018 |
| JP | 2018113849 A | 7/2018 |
| JP | 2019526221 A | 9/2019 |
| WO | 2016164851 A1 | 10/2016 |

* cited by examiner

REMOTE WIRELESS CHARGING TRANSMIT END, RECEIVE END, AND SYSTEM

CROSS-REFERENCE TO RELATED APPLICATIONS

This application is a continuation of International Application No. PCT/CN2020/087773, filed on Apr. 29, 2020, the disclosure of which is hereby incorporated by reference in its entirety.

TECHNICAL FIELD

This application relates to the field of wireless charging technologies, and in particular, to a remote wireless charging transmit end, receive end, and system.

BACKGROUND

Wireless charging means that a transmit end provides electric energy to a receive end in a wireless manner, to wirelessly charge the receive end. Wireless charging is usually to wirelessly transfer energy through a coupled electromagnetic field according to electromagnetic induction principles.

Currently, to implement remote wireless charging, a radio frequency signal transmitted by the transmit end serves as an energy carrier. The receive end receives the radio frequency signal and converts the radio frequency signal into a direct current source, to transfer electric energy. As shown in FIG. 1, a remote wireless charging system includes a transmit end 1 and a receive end 2. The transmit end 1 and the receive end 2 each include a power module and a communications module. A communications module 20 of the transmit end is configured to transmit a control signal through a first transmit antenna 30 of the transmit end 1, to control the receive end 2, specifically, to control a working status (including a power-on state, a standby state, or a sleep state) of the receive end. A power module 10 of the transmit end generates a power signal, and the power signal is transmitted through a second transmit antenna 20 of the transmit end, so that the receive end 2 stores electric energy and implements wireless charging.

However, although the transmit end may charge and control the receive end, the transmit end has a complex hardware structure and relatively high costs.

SUMMARY

This application provides a remote wireless charging transmit end, receive end, and system, to simplify an internal hardware structure and reduce costs.

According to a first aspect, embodiments of this application provide a remote wireless charging transmit end, where the transmit end is configured to wirelessly charge a receive end, and the transmit end includes a transmit end processor, a fundamental frequency-radio frequency conversion unit, and a transmit end antenna; the transmit end processor is configured to: generate a composite signal based on a control signal and a power signal, and send the composite signal to the fundamental frequency-radio frequency conversion unit, where the control signal is used to control a working status of the receive end, and the power signal is used to charge the receive end; the fundamental frequency-radio frequency conversion unit is configured to: convert the composite signal into a radio frequency signal, and send the radio frequency signal to the transmit end antenna; and the transmit end antenna is configured to transmit the radio frequency signal corresponding to the composite signal.

The remote wireless charging transmit end transmits only one composite signal. The composite signal is generated by the transmit end processor based on the control signal and the power signal. To be specific, the control signal and the power signal are combined, so that a signal transmission path can be simplified. Specifically, the fundamental frequency-radio frequency conversion unit converts the composite signal into the radio frequency signal, and the transmit end antenna transmits the radio frequency signal corresponding to the composite signal. The transmit end transmits only one signal, and there is no separate power signal or separate control signal. Therefore, the transmit end does not need to include a communications module or a power module that are separated from each other. In other words, two independent signal transmission paths are not required. Therefore, functions of wirelessly charging and controlling the receive end can be implemented by using one composite signal transmission path. An internal hardware structure of the transmit end is simplified, and costs of the entire transmit end are reduced.

In one embodiment, the transmit end antenna is further configured to: receive a feedback signal transmitted by the receive end, and send the feedback signal to the fundamental frequency-radio frequency conversion unit; the fundamental frequency-radio frequency conversion unit is further configured to: convert the feedback signal into a fundamental frequency signal, and send the fundamental frequency signal to the transmit end processor, where the feedback signal carries location information of the receive end; and the transmit end processor is further configured to adjust the power signal when determining, based on the location information, that a location of the receive end changes. An energy requirement of the receive end changes with a change in the location. The receive end sends, to the transmit end, the feedback signal that carries the location information, and the transmit end determines, based on the location information carried in the feedback signal, that the location of the receive end changes. In other words, when a requirement of the receive end changes, the transmit end adjusts the power signal based on the location information, in other words, adjusts the composite signal to meet the energy requirement of the receive end.

In one embodiment, the transmit end antenna is further configured to: receive a feedback signal transmitted by the receive end, and send the feedback signal to the fundamental frequency-radio frequency conversion unit; the fundamental frequency-radio frequency conversion unit is further configured to: convert the feedback signal into a fundamental frequency signal, and send the fundamental frequency signal to the transmit end processor, where the feedback signal carries battery level information of the receive end; and the transmit end processor is further configured to adjust the control signal and the power signal based on the battery level information. An energy requirement of the receive end changes with a change in a battery level of the receive end. The receive end sends, to the transmit end, the feedback signal that carries the battery level information, and the transmit end adjusts the control signal and the power signal based on the battery level information carried in the feedback signal, in other words, adjusts the composite signal to meet the energy requirement of the receive end.

In one embodiment, the transmit end processor is specifically configured to: generate a phase-modulated signal based on the control signal, generate a high peak-to-average power ratio PAPR waveform based on communication bandwidth and the power signal, and generate the composite signal based on the phase-modulated signal and the high PAPR waveform. The phase-modulated signal is not used to adjust amplitude of a high PAPR signal waveform, to ensure that a waveform of a multi-tone signal is not changed. Therefore, a relatively high peak-to-average power ratio is kept, so that the receive end has relatively high power conversion efficiency. The phase-modulated signal is used to adjust a phase of a high PAPR signal, and combine the control information into a phase change, to control the working status of the receive end, enable the receive end to be charged better, and increase direct current power output by the receive end.

In one embodiment, the transmit end processor is further configured to adjust the high PAPR waveform based on the feedback signal. The high PAPR waveform may be used to improve conversion efficiency of the receive end in a low power state. Therefore, when a target object is located on a farther location, the high PAPR waveform may be adjusted to increase a PAPR, and bandwidth may be increased within a specific range to increase microwave peak repetition frequency, to further improve the conversion efficiency of the receive end.

In one embodiment, the transmit end further includes a first switching switch; the fundamental frequency-radio frequency conversion unit includes a signal sending path and a signal receiving path; a first end of the first switching switch is connected to the transmit end antenna; and the transmit end processor is configured to control a second end of the first switching switch to connect to the signal sending path, to send the composite signal, and is further configured to control the second end of the first switching switch to connect to the signal receiving path, to receive the feedback signal. The transmit end includes one antenna. A quantity of antennas is reduced, and costs of the entire transmit end are reduced.

In one embodiment, the transmit end antenna includes a transmit end transmit antenna and a transmit end receive antenna; the fundamental frequency-radio frequency conversion unit includes a signal sending path and a signal receiving path; the transmit end transmit antenna is connected to the signal sending path, and the transmit end transmit antenna is configured to transmit the composite signal; and the transmit end receive antenna is connected to the signal receiving path, and the transmit end receive antenna is configured to receive the feedback signal. The transmit end includes two antennas. A quantity of switches is reduced, and no control switch needs to be used to switch between paths, so that the transmit end is controlled in a simpler manner.

According to a second aspect, embodiments of this application provide a remote wireless charging receive end, including a receive end processor, a power module, a communications module, and a receive end antenna, where the receive end antenna is configured to receive a radio frequency signal transmitted by a transmit end, where the radio frequency signal is a composite signal generated by the transmit end based on a control signal and a power signal; the power module is configured to convert the composite signal into energy for storage, to supply power to the receive end processor and the communications module; the communications module is configured to: obtain the control signal from the composite signal, and send the control signal to the receive end processor; and the receive end processor is configured to control a working status of the receive end based on the control signal.

The receive end antenna obtains the composite signal through a composite signal transmission path, the power module converts the composite signal into energy for storage, to provide electric energy for the communications module and the receive end processor, and the communications module obtains the control signal from the composite signal, so that the receive end processor controls the working status of the receive end based on the control signal.

In one embodiment, the receive end processor is further configured to send a feedback signal to the communications module, where the feedback signal carries location information of the receive end; the communications module is further configured to: convert the feedback signal into a radio frequency signal, and send the radio frequency signal to the receive end antenna; and the receive end antenna is further configured to transmit the radio frequency signal corresponding to the feedback signal, so that the transmit end adjusts the power signal when determining, based on the location information, that a location of the receive end changes. The receive end sends, to the transmit end, the feedback signal that carries the location information, so that when the location of the receive end changes, namely, when an energy requirement of the receive end changes, the transmit end adjusts the power signal based on the location information, in other words, adjusts the composite signal to meet the energy requirement of the receive end.

In one embodiment, the receive end processor is further configured to send a feedback signal to the communications module, where the feedback signal further carries battery level information of the receive end, so that the transmit end adjusts the control signal and the power signal based on the battery level information. The receive end sends, to the transmit end, the feedback signal that carries the battery level information, so that when a battery level of the receive end changes, namely, when an energy requirement of the receive end changes, the transmit end adjusts the power signal and the control signal based on the battery level information, in other words, adjusts the composite signal to meet the energy requirement of the receive end.

In one embodiment, the receive end further includes a second switching switch and a third switching switch, where the communications module includes a communication sending path and a communication receiving path; a first end of the second switching switch is connected to the receive end antenna; and the receive end processor is configured to: to receive the composite signal, first control a second end of the second switching switch to connect to a first end of the third switching switch, control a second end of the third switching switch to connect to the communication receiving path, and then control the second end of the second switching switch to connect to the power module. One antenna is used to receive or send the composite signal or the feedback signal, and a quantity of receive end antennas is reduced, to simplify a structure of the receive end, and reduce costs of the receive end.

In one embodiment, the receive end further includes a second switching switch and a third switching switch; the communications module includes a communication sending path and a communication receiving path; a first end of the second switching switch is connected to the receive end antenna; and the receive end processor is configured to: to send the feedback signal, control a second end of the second switching switch to connect to a first end of the third switching switch, and control a second end of the third switching switch to connect to the communication sending path. One antenna is used to receive or send the composite signal or the feedback signal, and a quantity of receive end antennas is reduced, to simplify a structure of the receive end, and reduce costs of the receive end.

In one embodiment, the receive end antenna includes a receive end receive antenna and a receive end transceiver antenna; the receive end receive antenna is connected to the power module, and the receive end receive antenna is configured to receive the composite signal; the receive end further includes a fourth switching switch, and a first end of the fourth switching switch is connected to the receive end transceiver antenna; the communications module includes a communication sending path and a communication receiving path; and the receive end processor is configured to control a second end of the fourth switching switch to connect to the communication receiving path, to receive the composite signal, and is configured to control the second end of the fourth switching switch to connect to the communication sending path, to send the feedback signal. Two antennas and one switch are used, and a quantity of switches is reduced.

In one embodiment, the receive end antenna includes a first receive antenna, a second receive antenna, and a first transmit antenna; the first receive antenna is connected to the power module, and the first receive antenna is configured to receive the composite signal; the communications module includes a communication sending path and a communication receiving path; the second receive antenna is connected to the communication receiving path, and is configured to receive the composite signal; and the first transmit antenna is connected to the communication sending path, and is configured to send the feedback signal. Three antennas are used, and a quantity of switches is reduced, so that no control switch needs to be used to switch between modules or paths.

In one embodiment, the receive end further includes a fifth switching switch; a first end of the fifth switching switch is connected to the receive end antenna; and the receive end processor is configured to: to receive the composite signal, first control a second end of the fifth switching switch to connect to the communications module, and then control the second end of the fifth switching switch to connect to the power module. The receive end includes only a communication receiving path, and does not include a communication sending path, to simplify an internal structure of the receive end, and reduce costs of the receive end.

In one embodiment, the receive end further includes a power splitter; and a first end of the power splitter is connected to the receive end antenna, a second end of the power splitter is connected to the power module and the communications module, and the power splitter is configured to: divide received composite signals into two parts, and respectively send the two parts to the power module and the communications module. The receive end includes only a communication receiving path, and does not include a communication sending path, to simplify an internal structure of the receive end. In addition, the receive end includes one antenna, to reduce costs of the receive end. In addition, the power splitter is used, so that no control switch needs to be used to switch between modules.

In one embodiment, the receive end antenna includes a third receive antenna and a fourth receive antenna; the third receive antenna is connected to the power module, and the third receive antenna is configured to receive the composite signal; and the fourth receive antenna is connected to the communications module, and the fourth receive antenna is configured to receive the composite signal. The receive end includes only a communication receiving path, and does not include a communication sending path, to simplify an internal structure of the receive end, and reduce costs of the receive end. Two antennas are used, so that no control switch needs to be used to switch between modules.

According to a third aspect, embodiments of this application provide a remote wireless charging system. The system includes the foregoing described transmit end and the foregoing described receive end, and the transmit end is configured to wirelessly charge the receive end.

In one embodiment, the transmit end and the receive end perform wireless communication through in-band communication.

In one embodiment, the receive end is any one of the following: an intelligent communications terminal, a wearable device, a sensor, or an intelligent battery device.

It can be learned from the foregoing technical solutions that the embodiments of this application have the following advantages:

The remote wireless charging transmit end provided in the embodiments transmits only one composite signal. The composite signal is generated by the transmit end processor based on the control signal and the power signal. To be specific, the control signal and the power signal are combined, so that the signal transmission path can be simplified. Specifically, the fundamental frequency-radio frequency conversion unit converts the composite signal into the radio frequency signal, and the transmit end antenna transmits the radio frequency signal corresponding to the composite signal.

The transmit end transmits only one signal, and there is no separate power signal or separate control signal. Therefore, the transmit end does not need to include a communications module or a power module that are separated from each other, to transmit the control signal by using the communications module, and to transmit the power signal by using the power module. In other words, two independent signal transmission paths are not required. Because the transmit end generates and transmits only one composite signal, it only needs to be ensured that there is a composite signal transmission path inside the transmit end. Therefore, the transmit end provided in the embodiments of this application may implement functions of wirelessly charging and controlling the receive end by using one composite signal transmission path. An internal hardware structure of the transmit end is simplified, and costs of the entire transmit end are reduced.

DESCRIPTION OF EMBODIMENTS

To make persons skilled in the art better understand the technical solutions provided in the embodiments of this application, the following clearly and completely describes the technical solutions in the embodiments of the present disclosure with reference to the accompanying drawings in the embodiments of the present disclosure.

In a wireless charging system, communication may be performed through in-band communication or out-of-band communication. The following provides brief description with reference to FIG. 1.

Figure 1:
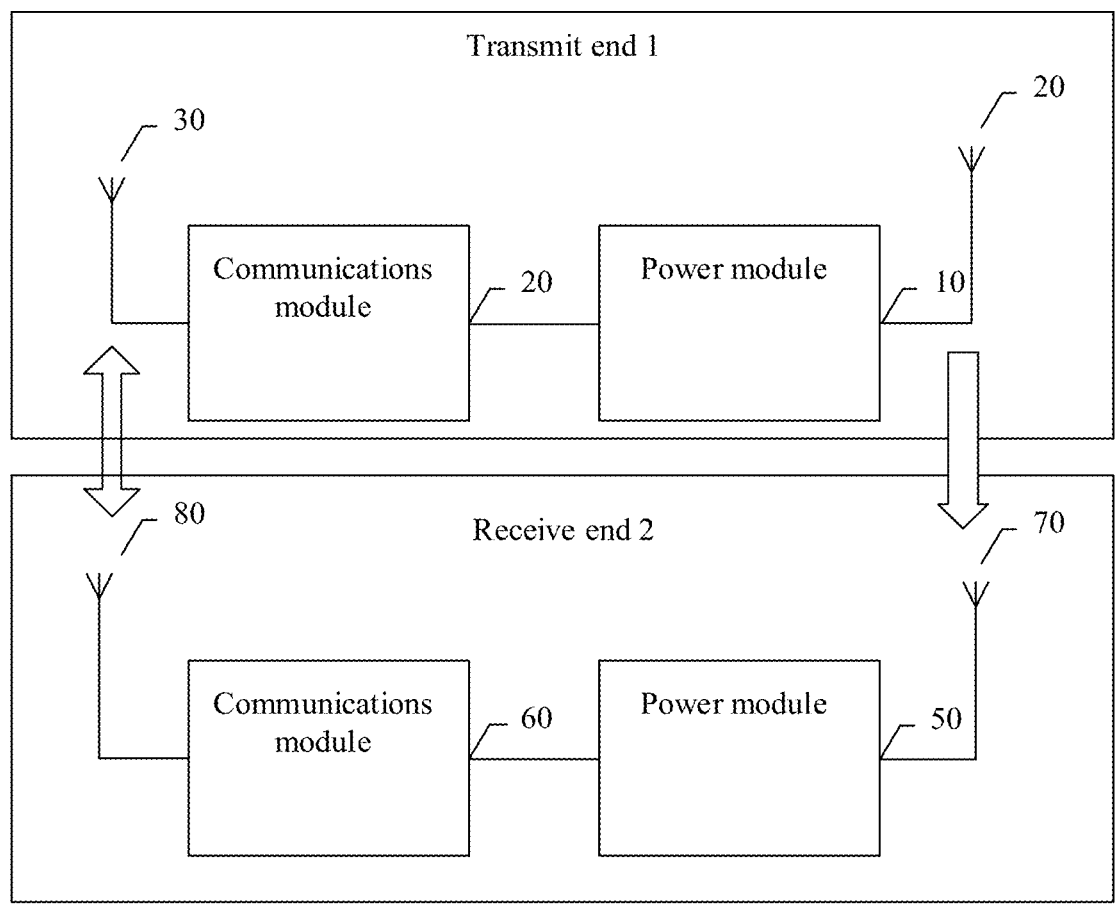
FIG. 1 is a schematic diagram of a remote wireless charging system.

As shown in FIG. 1, a transmit end 1 respectively sends a control signal and a power signal through two independent transmission paths. There are the following two manners.

Manner 1: In-Band Communication.

The transmit end 1 uses a same frequency band to transmit the control signal and the power signal. In a common communications system, because a same frequency band can be used to send only one type of signal at a same time, when the transmit end 1 sends a signal through in-band communication, the transmit end 1 needs to separately send the control signal and the power signal in different time periods. In other words, the receive end cannot simultaneously receive the control signal and the power signal.

Manner 2: Out-of-Band Communication.

The transmit end 1 respectively uses different frequency bands to send the control signal and the power signal. One frequency band is used to transmit the power signal, and another frequency band is used to transmit the control signal. Frequency bands occupied in this case are more than those occupied in the in-band communication.

Whether the transmit end and the receive end communicate through in-band communication or out-of-band communication is not limited in this application. In the following embodiments of this application, the in-band communication is used as an example for description. In other words, a same frequency band is used to send the control signal and the power signal. A transmit end controller generates a composite signal based on the control signal and the power signal. Because the composite signal is only one type of signal, only one transmission path is required, and in a same frequency band, the control signal and the power signal do not need to be sent in two time periods. There is no problem that time-division multiplexing is performed because there is only one frequency band. The transmit end requires only one signal transmission path, and an internal structure of the transmit end may be simplified.

To make persons skilled in the art better understand the technical solutions provided in the embodiments of this application, the following first describes an application scenario of a remote wireless charging system provided in the embodiments.

Figure 2:
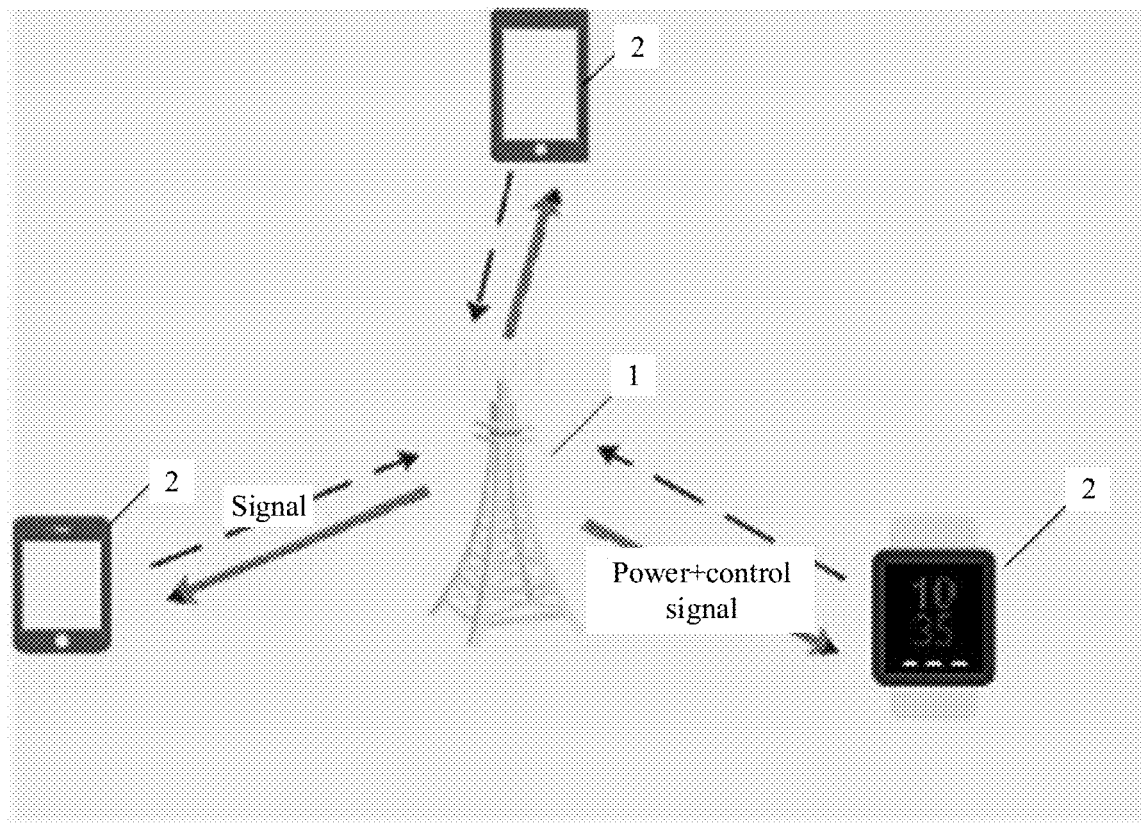
FIG. 2 is a schematic diagram of a remote wireless charging system according to an embodiment.

FIG. 2 is a schematic diagram of a remote wireless charging system according to an embodiment.

The remote wireless charging system provided in this embodiment includes a transmit end 1 and a receive end 2, and the transmit end 1 wirelessly charges the receive end 2.

A quantity of receive ends in the wireless charging system is not specifically limited in the following embodiments. For example, the transmit end may wirelessly charge one receive end, or may wirelessly charge a plurality of receive ends. For example, the wireless charging system in FIG. 2 includes one transmit end 1 and three receive ends 2.

A manner in which the transmit end charges the plurality of receive ends is not limited in this embodiment. For example, when wirelessly charging the plurality of receive ends simultaneously, the transmit end may evenly charge each receive end. In other words, all the receive ends receive same energy. Alternatively, when a receive end in the plurality of receive ends has a relatively low battery level, the transmit end may preferentially charge the receive end with a relatively low battery level.

The transmit end 1 is not specifically limited in this embodiment. For example, the transmit end 1 may be a device such as a base station, a router, or a radio frequency charging station.

The receive end 2 is not specifically limited in this embodiment. For example, based on whether a location of the receive end moves when the receive end works, there may be two types of receive ends: a mobile terminal or a stationary terminal. For example, the mobile terminal may be a communications terminal (a mobile phone), a sound generation device (for example, a sounder), or a wearable device (for example, a watch, a wristband, or a headset). The stationary terminal may include a sensor and an internet of things device. FIG. 2 is used as an example. The transmit end 1 is a base station, and the three receive ends are respectively a mobile phone, a tablet computer, and a smartwatch. The base station wirelessly charges the mobile phone, the tablet computer, and the smartwatch respectively.

The following describes a wireless charging principle by using an example in which one transmit end 1 wirelessly charges one receive end 2.

The transmit end 1 transmits, to the receive end 2, a radio frequency signal corresponding to a composite signal. The composite signal carries both a power signal and a control signal. The receive end 2 receives and demodulates the composite signal, converts radio frequency energy into a direct current source based on the power signal carried in the composite signal, to implement storage of electrical energy, and controls a working status of the receive end based on the control signal carried in the composite signal.

The working status of the receive end is not specifically limited in this embodiment. For example, the working status may be that the receive end is powered on or the receive end sleeps. Specifically, when a battery level of the receive end is lower than a preset battery level, the receive end is controlled to be powered on and is wirelessly charged. When the transmit end corresponds to a plurality of receive ends, if a battery level of all the plurality of receive ends is simultaneously lower than the preset battery level, the transmit end may be unable to wirelessly charge all the receive ends simultaneously because the transmit end may provide limited power. In this case, some receive ends may be controlled to enter a sleep working state. The receive end in the sleep state is not charged, and a receive end that is not in the sleep state is wirelessly charged first. After the charged receive end is fully charged or charged to a battery level with which the receive end can work, the receive end in the sleep state is wirelessly charged.

The receive end 2 may also send a feedback signal to the transmit end 1, to feed back information about the receive end. Content of the feedback signal is not specifically limited in this embodiment. For example, the content may be a power requirement or location information.

To make persons skilled in the art better understand the technical solutions provided in the embodiments of this application, the following clearly describes the technical solutions in the embodiments of this application with reference to the accompanying drawings in the embodiments.

Embodiment 1 of a Transmit End:

An embodiment of this application provides a remote wireless charging transmit end. A transmit end processor of the transmit end may generate a composite signal based on a power signal and a control signal, and send the composite signal through a transmission path, to wirelessly charge and control a receive end. An internal hardware structure of the transmit end is simplified, and costs of the entire transmit end are reduced.

The following describes this embodiment provided in this application in detail with reference to accompanying drawings.

Figure 3:
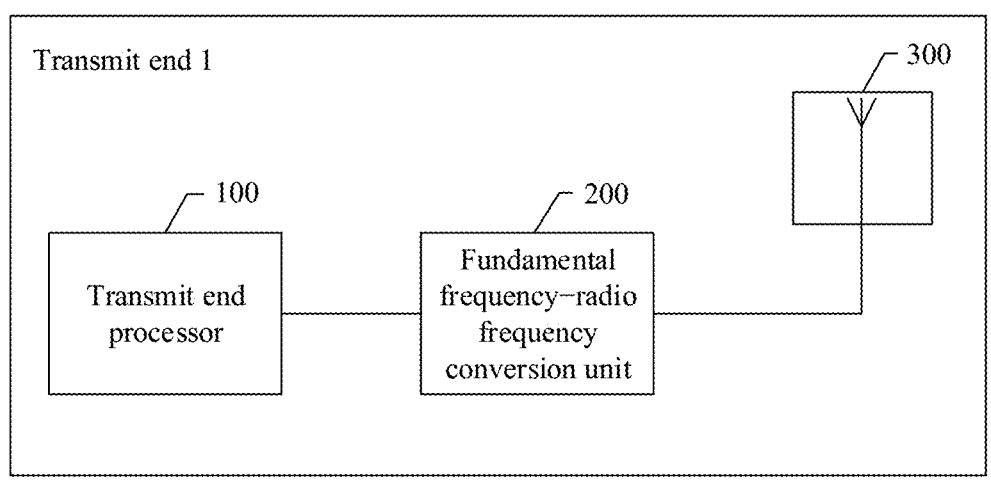
FIG. 3 is a schematic diagram of a remote wireless charging transmit end according to an embodiment.

FIG. 3 is a schematic diagram of a remote wireless charging transmit end according to this embodiment.

For ease of description, descriptions are provided below by using one receive end as an example.

A transmit end 1 provided in this embodiment is configured to wirelessly charge a receive end 2. The transmit end 1 includes a transmit end processor 100, a fundamental frequency-radio frequency conversion unit 200, and a transmit end antenna 300.

The transmit end processor 100 is configured to: generate a composite signal based on a control signal and a power signal, and send the composite signal to the fundamental frequency-radio frequency conversion unit 200. The control signal is used to control a working status of the receive end 2, and the power signal is used to wirelessly charge the receive end 2. The working status of the receive end 2 may include a power-on state, a power-off state, a sleep state, and the like.

A type of the composite signal is not specifically limited in this embodiment. For example, the composite signal may be a multi-tone signal with a high peak-to-average power ratio (PAPR), or may be a sine wave signal, a square wave signal, or a triangular wave signal. Compared with a common equal-amplitude signal, the multi-tone signal may allow higher power conversion efficiency of the receive end at same power.

The multi-tone signal is obtained by superimposing a plurality of wavelets with a same phase or similar phases, and a superimposed signal is modulated by using a signal with a same initial phase, to generate a relatively large instantaneous power peak value. Therefore, the multi-tone signal has a higher peak-to-average power ratio than a common signal, so that power conversion efficiency of a wireless charging system can be improved.

However, a type of a high PAPR signal is not specifically limited in this embodiment, and various signals with relatively high peak-to-average power ratios may be used. For example, the high PAPR signal may be a multi-tone signal, an on-off signal, or an ultra-wideband signal.

The transmit end provided in this embodiment may send the composite signal to the receive end, or may receive a feedback signal sent by the receive end. A case in which the transmit end does not receive the feedback signal is described below with reference to FIG. 4, and a case in which the transmit end receives the feedback signal is described below with reference to FIG. 5.

Figure 4:
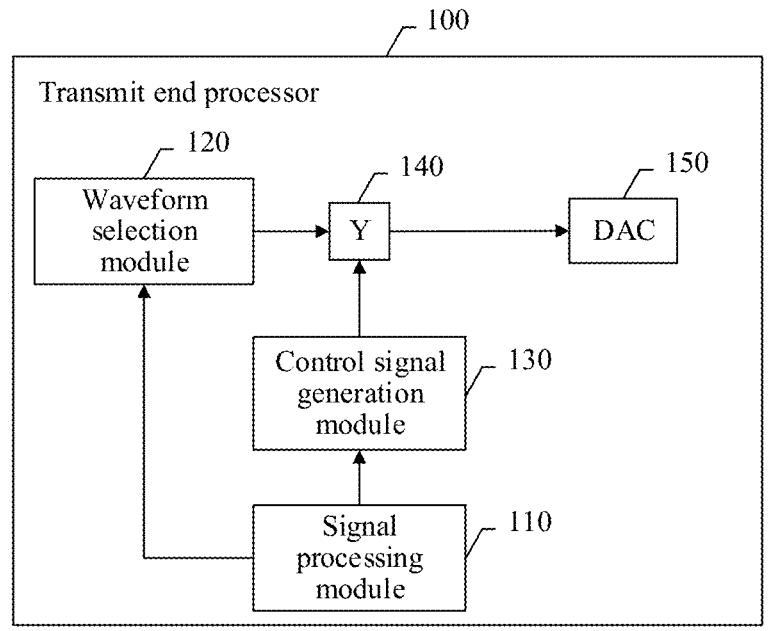
FIG. 4 is a schematic diagram of a transmit end processor according to an embodiment.

FIG. 4 is a schematic diagram of a transmit end processor according to this embodiment.

The transmit end processor 100 includes a signal processing submodule 110, a waveform selection module 120, a control signal generation module 130, a mixer 140, and a digital-to-analog converter (DAC) 150.

Figure 5:
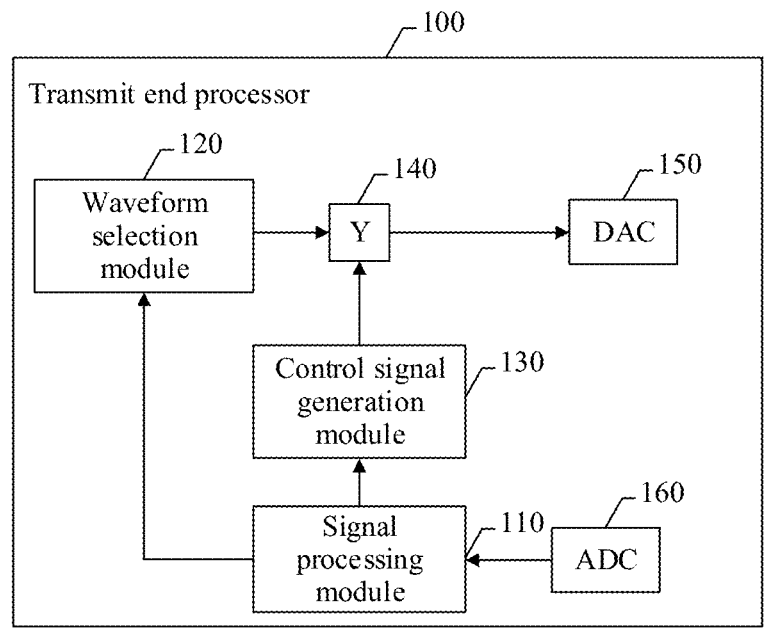
FIG. 5 is a schematic diagram of another transmit end processor according to an embodiment.

FIG. 5 is a schematic diagram of another transmit end processor according to this embodiment.

The transmit end processor 100 includes a signal processing submodule 110, a waveform selection module 120, a control signal generation module 130, a mixer 140, a DAC 150, and an analog-to-digital converter (ADC) 160.

When the transmit end needs to receive the feedback signal from the receive end, the feedback signal is converted by the fundamental frequency-radio frequency conversion unit 200 from a radio frequency signal to a fundamental frequency signal, and the fundamental frequency signal corresponds to a form of an analog signal. Therefore, the analog-to-digital converter 160 needs to convert an analog signal corresponding to the feedback signal into a digital signal, and then send the digital signal to the signal processing submodule 110 for processing.

The fundamental frequency-radio frequency conversion unit 200 is configured to: convert the composite signal into a radio frequency signal, and send the radio frequency signal to the transmit end antenna 300.

Because the transmit end antenna 300 transmits energy to the receive end in a form of the radio frequency signal, the fundamental frequency-radio frequency conversion unit 200 needs to convert, from a form of the fundamental frequency signal to the form of the radio frequency signal, the composite signal transmitted by the transmit end processor 100, and then send the composite signal to the transmit end antenna 300.

Figure 6:
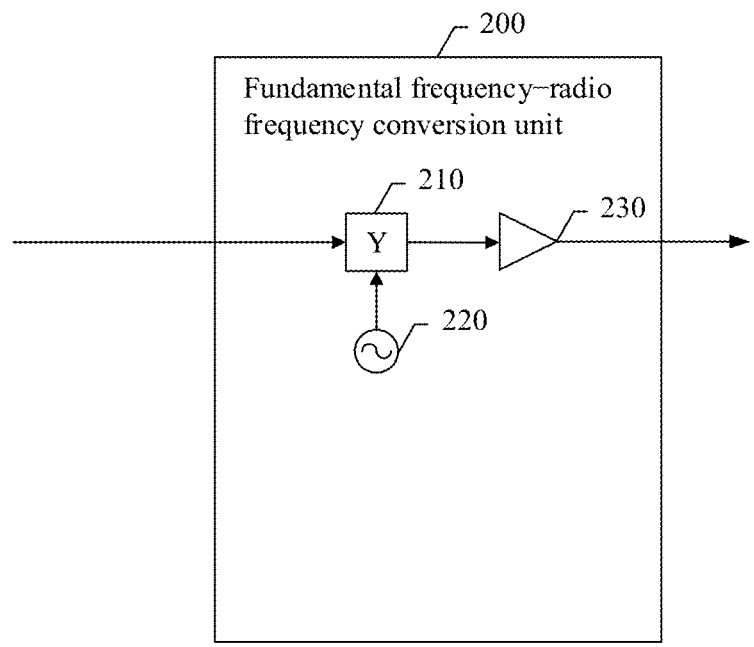
FIG. 6 is a schematic diagram of a fundamental frequency-radio frequency conversion unit according to an embodiment.

FIG. 6 is a schematic diagram of a fundamental frequency-radio frequency conversion unit according to this embodiment.

The fundamental frequency-radio frequency conversion unit 200 includes a mixer 210, an oscillator 220, and a power amplifier 230.

A structure of the fundamental frequency-radio frequency conversion unit 200 is described below by using an example in which the transmit end needs to receive the feedback signal.

Figure 7:
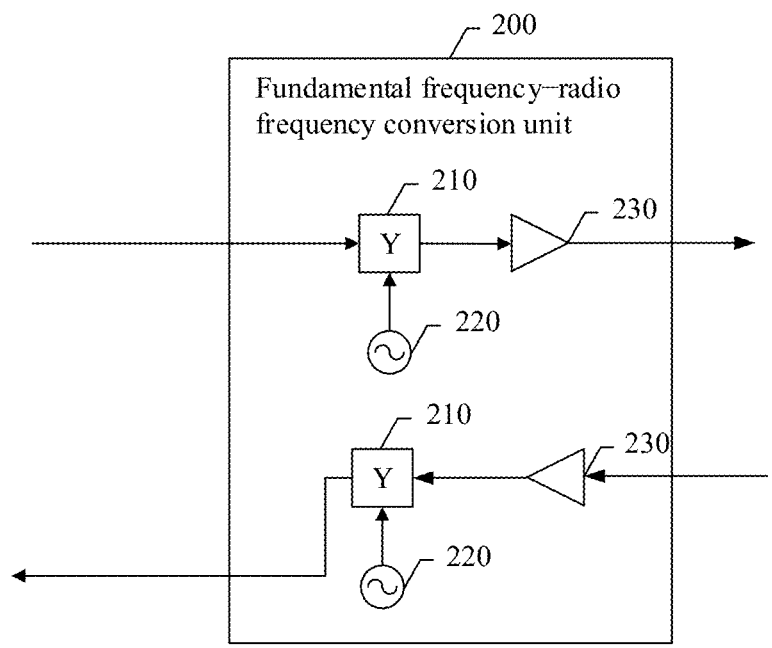
FIG. 7 is a schematic diagram of another fundamental frequency-radio frequency conversion unit according to an embodiment.

FIG. 7 is a schematic diagram of another fundamental frequency-radio frequency conversion unit according to this embodiment.

When the transmit end needs to receive the feedback signal from the receive end, the transmit end not only needs to transmit a signal, but also needs to receive a signal. In other words, the fundamental frequency-radio frequency conversion unit 200 includes two signal transmission paths that are respectively a signal sending path and a signal receiving path. The two paths each include a mixer 210, an oscillator 220, and a power amplifier 230. The transmit end antenna 300 is configured to transmit the radio frequency signal corresponding to the composite signal, so that the receive end 2 receives the composite signal through a receive end antenna.

The transmit end antenna 300 is not specifically limited in this embodiment, and may be selected by persons skilled in the art based on an actual requirement.

For example, when the transmit end only needs to transmit a signal, the transmit end antenna 300 may be one antenna or one group of antenna arrays.

For another example, when the transmit end not only needs to send a signal, but also needs to receive a signal, the transmit end antenna 300 may be at least two antennas. One antenna is used to transmit a signal, and one antenna is used to receive a signal. Alternatively, the transmit end antenna 300 may be one antenna, and a switching switch is used to control the antenna to receive a signal or transmit a signal.

The remote wireless charging transmit end provided in this embodiment transmits only one composite signal. The composite signal is generated by the transmit end processor based on the control signal and the power signal. To be specific, the control signal and the power signal are combined, so that a signal transmission path can be simplified. The fundamental frequency-radio frequency conversion unit converts the composite signal into the radio frequency signal, and the transmit end antenna transmits the radio frequency signal corresponding to the composite signal.

The transmit end transmits only one signal, and there is no separate power signal or separate control signal. Therefore, the transmit end does not need to include a communications module or a power module that are separated from each other, to transmit the control signal by using the communications module, and to transmit the power signal by using the power module. In other words, two independent signal transmission paths are not required. Because the transmit end generates and transmits only one composite signal, it only needs to be ensured that there is a composite signal transmission path inside the transmit end. Therefore, the transmit end provided in this embodiment of this application may implement functions of wirelessly charging and controlling the receive end by using one composite signal transmission path. An internal hardware structure of the transmit end is simplified, and costs of the entire transmit end are reduced.

Embodiment 2 of a Transmit End:

An embodiment of this application provides a remote wireless charging transmit end. A transmit end processor of the transmit end may generate a high PAPR waveform based on a feedback signal, and generate a phase-modulated signal based on a control signal. The phase-modulated signal is not used to adjust envelope amplitude of a high PAPR signal waveform, but is used to adjust an overall phase of a high PAPR signal to generate a composite signal, thereby stimulating efficient power conversion of a receive end and increasing direct current power output by the receive end.

The following describes this embodiment provided in this application in detail with reference to accompanying drawings.

Figure 8:
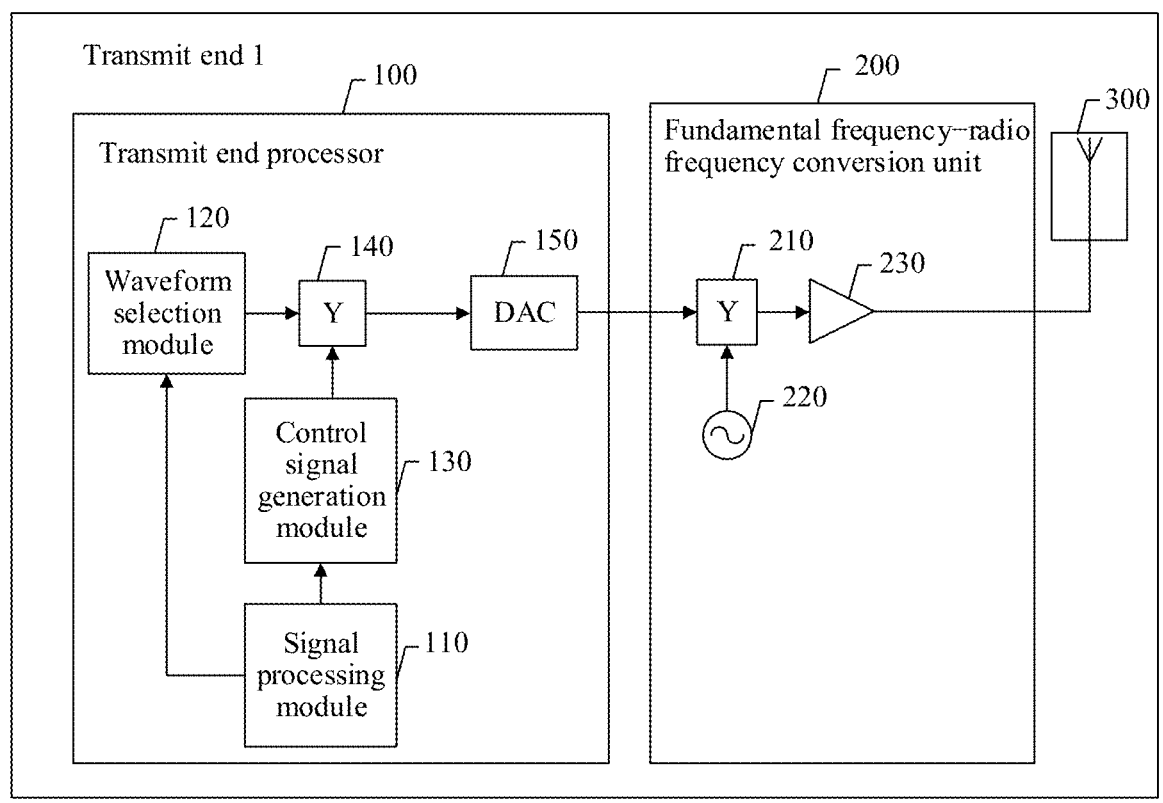
FIG. 8 is a schematic diagram of another remote wireless charging transmit end according to an embodiment.

FIG. 8 is a schematic diagram of another remote wireless charging transmit end according to this embodiment.

The transmit end includes a transmit end processor 100 in the form shown in FIG. 4, a fundamental frequency-radio frequency conversion unit 200 in the form shown in FIG. 6, and a transmit end antenna 300.

A signal processing submodule 110 is configured to generate a power signal and a control signal. The signal processing submodule 110 sends the power signal to a waveform selection module 120, and sends the control signal to a control signal generation module 130.

A type of the signal processing submodule is not specifically limited in this embodiment. For example, the signal processing submodule may be a single-chip microcomputer or a digital processing chip.

A sequence in which the signal processing submodule 110 sends the power signal and the control signal is not specifically limited in this embodiment. For example, the signal processing submodule 110 may first send the power signal, and then send the control signal; may first send the control signal, and then send the power signal; or may simultaneously send the power signal and the control signal.

The waveform selection module 120 generates a corresponding waveform based on power and communication bandwidth B. In this embodiment, a high PAPR waveform is used as an example for description.

The control signal generation module 130 generates a corresponding phase-modulated signal based on the control signal. The phase-modulated signal has different forms based on different control signals, and a form of the phase-modulated signal is not specifically limited in this embodiment. For example, the control signal is 01101, and the phase-modulated signal is phase information that carries the control signal.

A mixer 140 generates a composite signal based on the high PAPR waveform and the phase-modulated signal.

A digital-to-analog converter 150 converts the composite signal from a digital signal to an analog signal, and sends the analog signal to a mixer 210 in a fundamental frequency-radio frequency unit 200, so that the fundamental frequency-radio frequency conversion unit 200 converts the composite signal into a radio frequency signal, and transmits the radio frequency signal to a receive end.

The following further describes a modulation principle of the composite signal by using a multi-tone signal in a high PAPR signal as an example.

Figure 9:
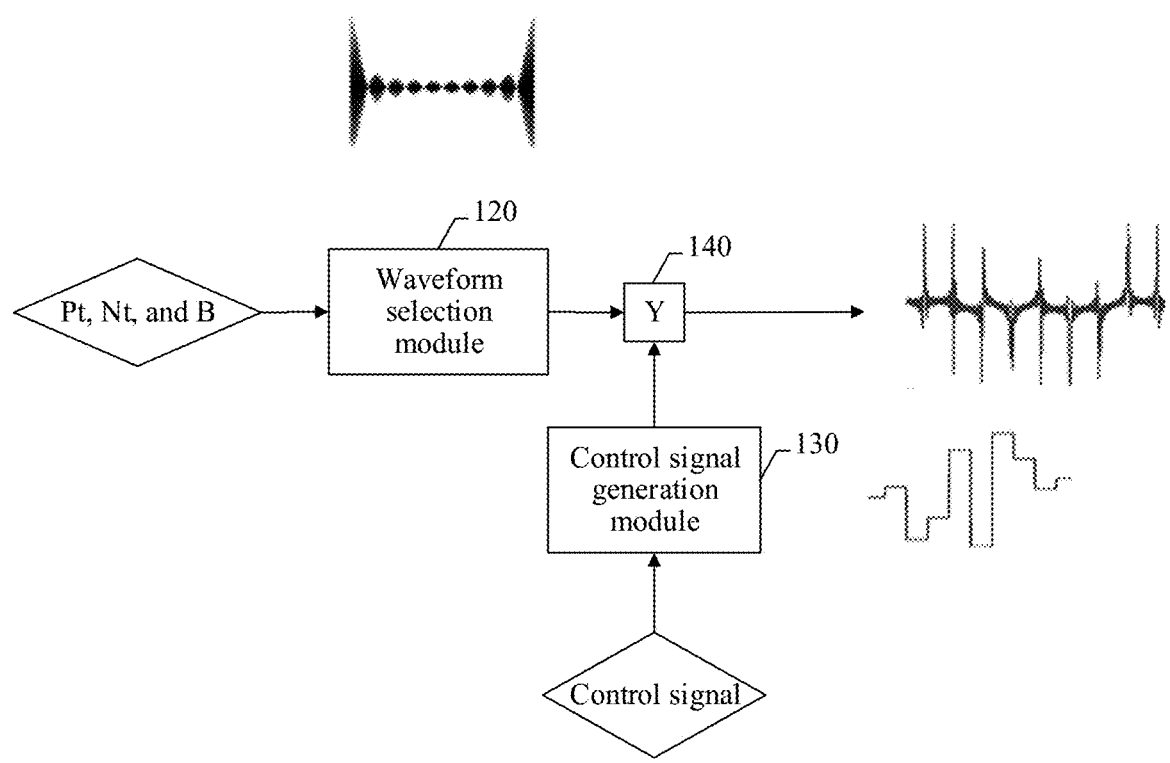
FIG. 9 is a flowchart of generating a composite signal according to an embodiment.

FIG. 9 is a flowchart of generating a composite signal according to this embodiment.

The waveform selection module 120 selects a corresponding multi-tone signal based on power Pt, a quantity Nt of tones, and communication bandwidth B of generation performed by the signal processing submodule 110, as shown by a signal pattern above the waveform selection module 120.

It should be noted that Nt determines a nature of the waveform. For example, Nt=2 indicates that two sine waves are superimposed, and Nt=3 indicates that three sine waves are superimposed. A larger value of Nt indicates higher peak amplitude of the waveform in a signal period.

The control signal generation module 130 generates the phase-modulated signal based on the control signal generated by the signal processing submodule 110, as shown by a signal pattern on a right side of the control signal generation module 130.

The mixer 140 generates the composite signal based on the phase-modulated signal and the multi-tone signal, as shown by a signal pattern on a right side of the mixer 140.

Figure 10:
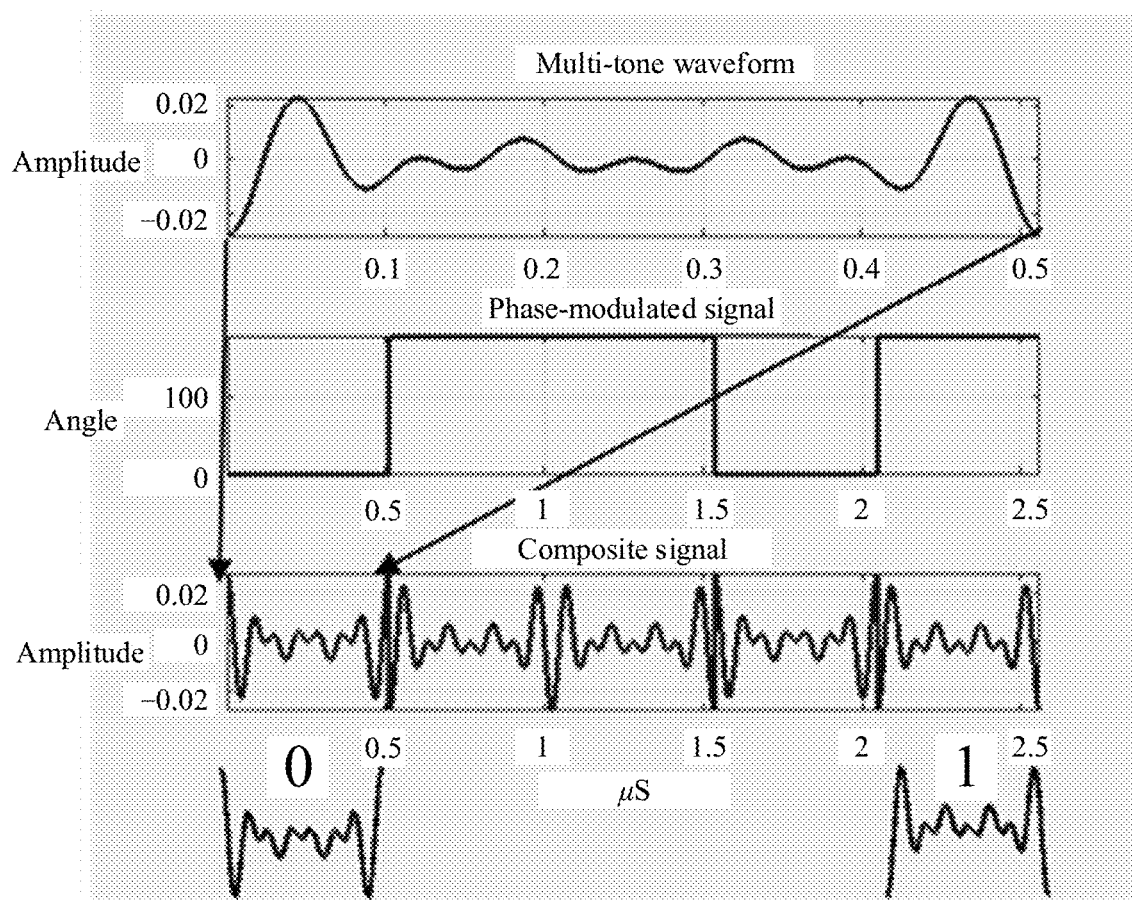
FIG. 10 is a schematic diagram that is of generating a composite signal and that corresponds to FIG. 9.

FIG. 10 is a schematic diagram that is of generating a composite signal and that corresponds to FIG. 9.

A signal in a first row is a waveform of a multi-tone signal corresponding to a case in which Nt=4 and B=8 MHz. The multi-tone signal is obtained by superimposing waveforms of four sine waves, a signal period ranges from 0 microseconds to 0.5 microsecond, and there are four peak values in the signal period.

A signal in a second row is the phase-modulated signal generated based on the control signal 01101, has a low level in the signal period from 0 microseconds to 0.5 microsecond, where the low level is denoted by 0, and has a high level in a signal period from 0.5 microsecond to one microsecond, where the high level is denoted by 1.

A signal in a third row is a composite signal generated based on the multi-tone signal in the first row and the phase-modulated signal in the second row. A waveform of the composite signal is the same as that of the multi-tone signal, and a phase of the composite signal is the same as a phase of the phase-modulated signal.

Therefore, only the phase of the multi-tone signal is changed, but the waveform of the multi-tone signal is not changed. In other words, envelope amplitude of the multi-tone signal is not changed, to ensure that the multi-tone signal does not become a common equal-amplitude signal or a low PAPR waveform, thereby ensuring relatively high power conversion efficiency. A phase change carries control information, to control a working status of the receive end, simulate the receive end to be charged better, and increase direct current power output by the receive end.

Figure 11:
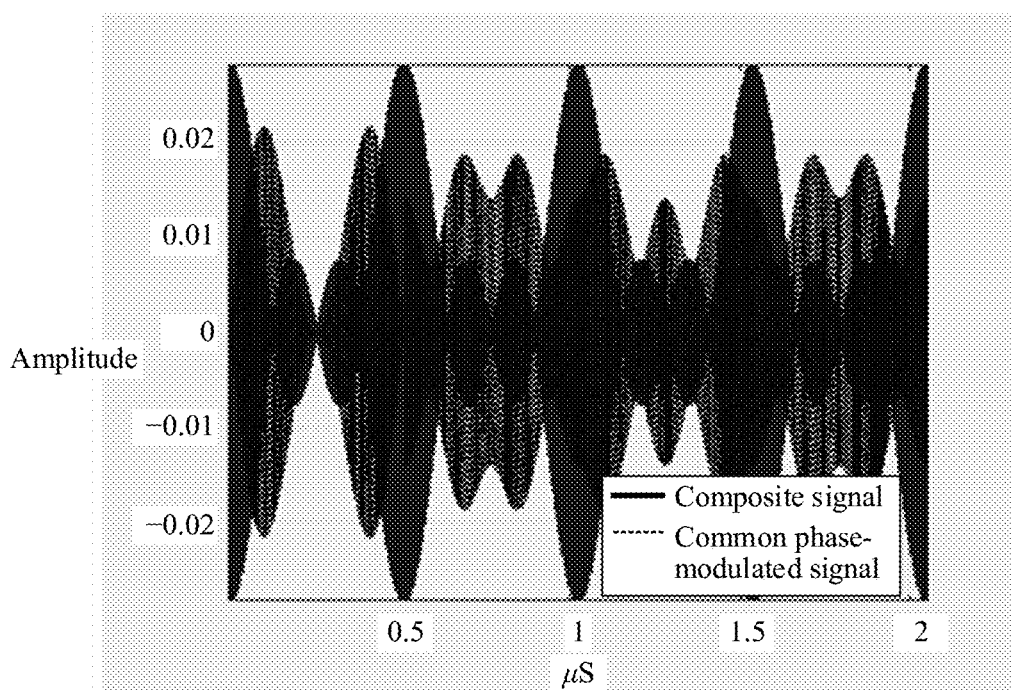
FIG. 11 is a diagram of a comparison between amplitude of a multi-tone signal in FIG. 9 and amplitude of a common equal-amplitude signal.

FIG. 11 is a diagram of a comparison between amplitude of a multi-tone signal in FIG. 9 and amplitude of a common equal-amplitude signal.

A dashed line indicates the common phase-modulated signal, and a solid line indicates the composite signal. It can be seen that the amplitude of the composite signal is larger than the amplitude of the common equal-amplitude signal, so that power conversion efficiency is higher.

Figure 12:
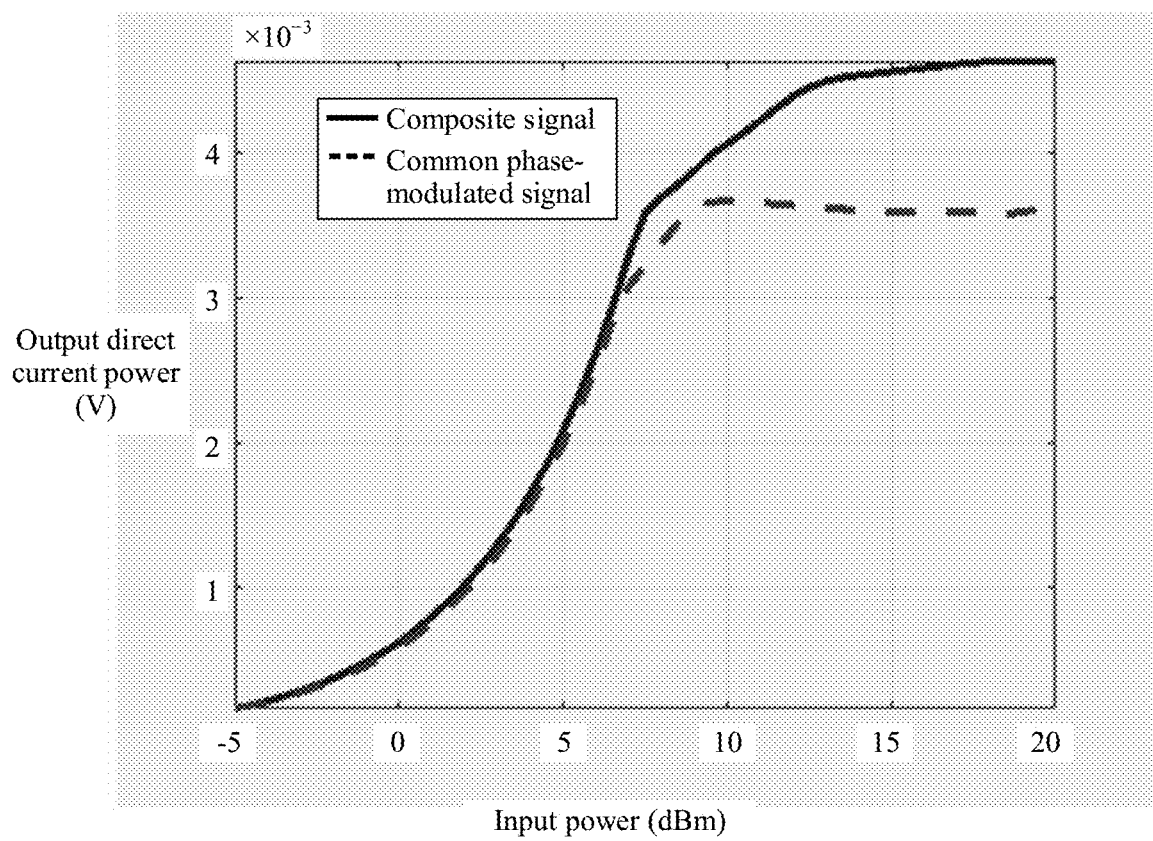
FIG. 12 is a diagram of a comparison between changes of a multi-tone signal in FIG. 9 and a common phase-modulated signal in direct current power as input power changes.

FIG. 12 is a diagram of a comparison between changes of a multi-tone signal in FIG. 9 and a common phase-modulated signal in direct current power as input power changes.

A dashed line indicates a curve of a change of the common phase-modulated signal in direct current power as input power changes, and a solid line indicates a curve of a change of the composite signal in direct current power as input power changes. It can be seen from this that, at same power, a receive end that uses the composite signal outputs direct current power greater than direct current power output by a receive end that uses the common phase-modulated signal, and therefore, has higher power conversion efficiency.

A phase modulation mode of the composite signal is not specifically limited in this embodiment. For example, a binary phase shift keying (BPSK) modulation mode, a quadrature phase shift keying (QPSK) modulation mode, or a 16-ary phase shift keying 16-PSK modulation mode may be used.

For example, if a control signal modulated in the BPSK modulation mode is 01101, a waveform of the phase-modulated signal shown in the second row in FIG. 5 may be generated.

The fundamental frequency-radio frequency conversion unit 200 is described below. Reference is still made to FIG. 8.

The mixer 210 receives the analog signal sent by the digital-to-analog converter DAC 150. Because the analog signal is a fundamental frequency signal, the mixer 210 and the oscillator 220 convert the fundamental frequency signal into a radio frequency signal, the power amplifier 230 amplifies the radio frequency signal and send the radio frequency signal to the transmit end antenna 300, and the transmit end antenna 300 transmits the radio frequency signal corresponding to the composite signal to the receive end.

The remote wireless charging transmit end provided in this embodiment generates the phase-modulated signal by using the control signal generation module in the transmit end processor, generates the high PAPR signal waveform by using the waveform selection module in the transmit end processor, and generates the composite signal based on the phase-modulated signal and the high PAPR signal waveform. The fundamental frequency-radio frequency conversion unit converts the composite signal into the radio frequency signal, and the transmit end antenna transmits the radio frequency signal corresponding to the composite signal.

The transmit end provided in this embodiment of this application may implement functions of wirelessly charging and controlling the receive end by using one composite signal transmission path. An internal hardware structure of the transmit end is simplified, and costs of the entire transmit end are reduced. In addition, the phase-modulated signal is not used to adjust amplitude of the high PAPR signal waveform, to ensure that a waveform of the multi-tone signal is not changed (not changed from the high PAPR signal to the common equal-amplitude signal, for example, a sine wave signal). Therefore, a relatively high peak-to-average power ratio is kept, so that the receive end has relatively high power conversion efficiency. The phase-modulated signal is used to adjust a phase of the high PAPR signal, and combine control information into the phase change, to control the working status of the receive end, enable the receive end to be charged better, and increase direct current power output by the receive end.

Embodiment 3 of a Transmit End:

Energy generated by the transmit end decreases with an increase in a distance. To be specific, as a distance between the transmit end and a receive end increases, more energy is consumed on a transmission path, less energy is received by the receive end, and transmission power and efficiency decrease accordingly. To ensure that the receive end receives energy that meets a requirement of the receive end, the following separately describes a stationary scenario and a mobile scenario that are use scenarios of the receive end.

The stationary scenario is a scenario in which a location of the receive end hardly changes during wireless charging. For example, when the receive end is an internet of things device, a movement range of the internet of things device is usually a factory, a repository, or an equipment room, and a location of the internet of things device hardly changes. In other words, a location of the receive end remains unchanged. This is more applicable to a case in which the transmit end provided in Embodiment 2 of a transmit end implements wireless charging. For example, the receive end may be a sensor located in a factory, or a printer located in a building.

The mobile scenario is a scenario in which a location of the transmit end changes during wireless charging. For example, when the receive end is an intelligent device such as a mobile phone or a headset, a location of the intelligent device frequently changes as a user moves. As the location of the receive end changes, energy required by the receive end also changes accordingly. For example, when the distance between the receive end and the transmit end increases, the receive end needs to be charged with more energy accordingly. Therefore, to meet an energy requirement of the receive end, the transmit end may adjust a power signal in a composite signal based on the energy requirement of the receive end.

The receive end may send the energy requirement of the receive end to the transmit end in a form of a feedback signal. Content of the feedback signal is not limited in this embodiment. For example, the feedback signal may include one or more of location information of the receive end and battery level information of the receive end.

Figure 13:
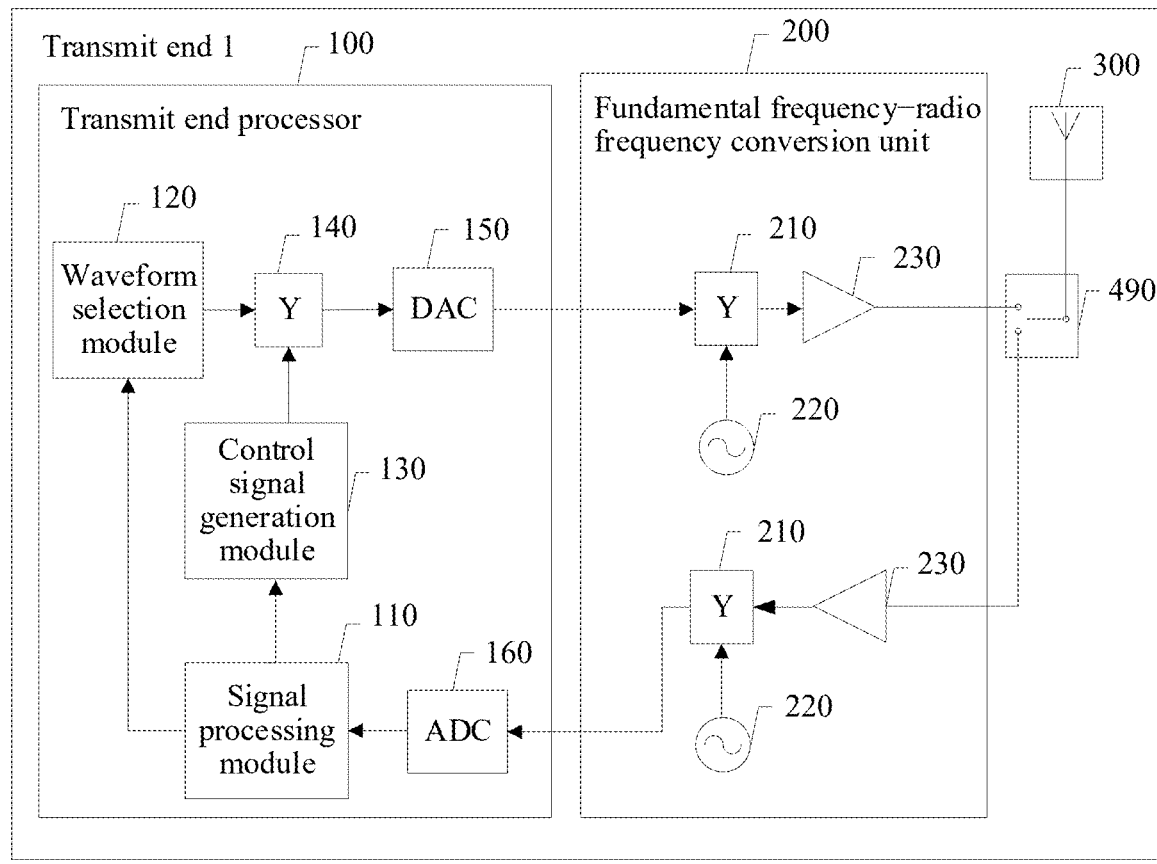
FIG. 13 is a schematic diagram of another remote wireless charging transmit end according to an embodiment.

FIG. 13 is a schematic diagram of another remote wireless charging transmit end according to this embodiment.

The transmit end includes a transmit end processor 100 in the form shown in FIG. 5, a fundamental frequency-radio frequency conversion unit 200 in the form shown in FIG. 7, a transmit end antenna 300, and a first switching switch 400.

The fundamental frequency-radio frequency conversion unit 200 includes a signal sending path and a signal receiving path. In FIG. 13, a path connected to a DAC 150 is the signal sending path, and a path connected to an ADC 160 is the signal receiving path.

A first end of the first switching switch 490 is connected to a transmit end antenna. The first switching switch 490 is connected to different paths, so that the transmit end antenna 300 is in a signal sending state or a signal receiving state.

The transmit end processor 100 controls a second end of the first switching switch 490 to connect to the signal sending path, to send a composite signal. A working principle of the path is the same as a principle of sending the composite signal in Embodiment 2 of a transmit end, and details are not described herein again.

The transmit end processor 100 controls the second end of the first switching switch 490 to connect to the signal receiving path, to receive a feedback signal.

A transmit end 1 receives, through the transmit end antenna 300, a feedback signal transmitted by a receive end 2, and the first switching switch 490 is connected to the signal receiving path. The feedback signal is amplified by a power amplifier 230 in a fundamental frequency-radio frequency module 200, converted by a mixer 210 and an oscillator 220 from a radio frequency signal to a fundamental frequency signal, and then sent to the ADC 160 in the transmit end processor 100. The ADC 160 converts the fundamental frequency signal into a digital signal, and sends the digital signal to a signal processing submodule 110. The signal processing submodule 110 demodulates key information based on the feedback signal converted into the digital signal, and adjusts a control signal and/or a power signal, thereby adjusting the composite signal. The transmit end processor 100 adjusts, based on the feedback signal from the receive end, a composite signal to be transmitted next time. An operation principle of adjusting the control signal and/or the power signal based on the feedback signal, thereby adjusting the composite signal is described below by using an example.

The ADC 160 converts the fundamental frequency signal into a digital signal, and sends the digital signal to a signal processing submodule 110. The signal processing submodule 110 demodulates key information based on the feedback signal converted into the digital signal, and adjusts a control signal and/or a power signal, thereby adjusting the composite signal. The transmit end processor 100 adjusts, based on the feedback signal from the receive end, a composite signal to be transmitted next time.

An operation principle of adjusting the control signal and/or the power signal based on the feedback signal, thereby adjusting the composite signal is described below by using an example.

For example, the feedback signal carries location information of the receive end. The transmit end processor 100 determines, based on the location information, whether a location of the receive end changes. After the location of the receive end changes, the power signal is adjusted, to generate an adjusted composite signal to meet an energy requirement of the receive end.

For another example, the feedback signal carries battery level information of the receive end, and the transmit end processor 100 adjusts the control signal and the power signal based on the battery level information, to generate an adjusted composite signal to meet an energy requirement of the receive end.

For still another example, the feedback signal carries location information and battery level information of the receive end. The transmit end processor 100 adjusts the power signal based on the location information, and adjusts the control signal and the power signal based on the battery level information, to generate an adjusted composite signal to meet an energy requirement of the receive end.

A subject that determines that the feedback signal changes is not limited in this embodiment. For example, the receive end determines that the feedback signal changes, and sends the feedback signal to the transmit end, and the transmit end directly adjusts the composite signal based on the feedback signal. For yet another example, the receive end sends the feedback signal to the transmit end in real time or at a fixed time interval, and after determining that the feedback signal changes, the transmit end adjusts the composite signal based on the feedback signal.

For still yet another example, the transmit end may adjust a waveform of a PAPR signal based on the feedback signal. To be specific, Nt and B (B determines peak repetition frequency) are adjusted to adjust a multi-tone waveform, or waveforms with different PAPR characteristics are used, thereby adjusting the composite signal.

A high PAPR waveform may be used to improve conversion efficiency of the receive end in a low power state. Therefore, when a target object is located on a farther location (in this case, there is a relatively high path loss), Nt may be increased to increase a PAPR, and bandwidth may be increased within a specific range to increase microwave peak repetition frequency, to further improve the conversion efficiency of the receive end.

The transmit end continuously adjusts the control signal and/or the power signal based on the feedback signal, thereby generating a composite signal that meets a requirement of the receive end, to meet a continuously changing requirement of the receive end.

Figure 14:
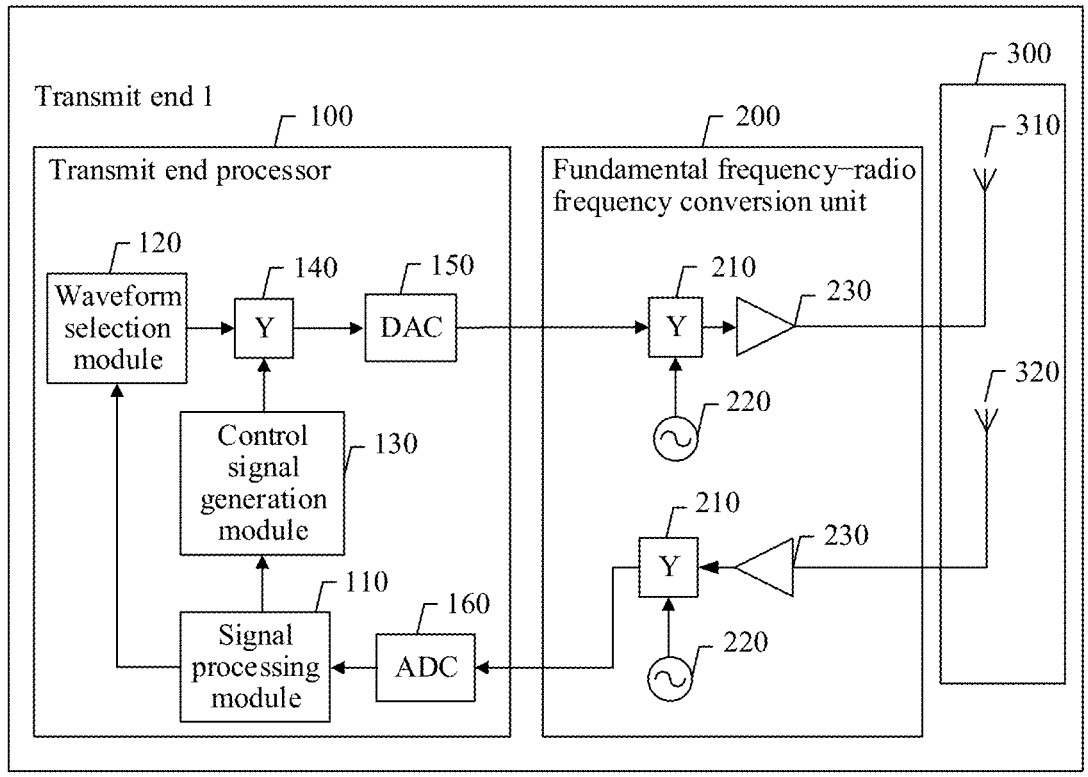
FIG. 14 is a schematic diagram of another remote wireless charging transmit end according to an embodiment.

FIG. 14 is a schematic diagram of another remote wireless charging transmit end according to this embodiment.

A fundamental frequency-radio frequency conversion unit 200 includes a signal sending path and a signal receiving path.

A transmit end transmit antenna 310 is connected to the signal sending path, and a transmit end receive antenna 320 is connected to the signal receiving path.

The transmit end transmit antenna 310 is configured to transmit a composite signal, and the transmit end receive antenna 320 is configured to receive the feedback signal.

The following describes only a difference between FIG. 14 and FIG. 13, and a same part is not described again.

In FIG. 14, instead of using first switching switch 490 to control the transmit end antenna 300 to be in a signal sending state or a signal receiving state, the transmit end transmit antenna 310 and the transmit end receive antenna 320 are directly used to respectively send and receive a signal.

The remote wireless charging transmit end provided in this embodiment generates a phase-modulated signal by using a control signal generation module in a transmit end processor, generates a high PAPR signal waveform by using a waveform selection module in the transmit end processor, and generates a composite signal based on the phase-modulated signal and the high PAPR signal waveform. The fundamental frequency-radio frequency conversion unit converts the composite signal into a radio frequency signal, and the transmit end antenna transmits the radio frequency signal corresponding to the composite signal.

The transmit end provided in this embodiment of this application is more applicable to wirelessly charging a receive end in a mobile scenario. Functions of wirelessly charging and controlling the receive end can be implemented by using one composite signal transmission path. An internal hardware structure of the transmit end is simplified, and costs of the entire transmit end are reduced. In addition, the phase-modulated signal is not used to adjust envelope amplitude of the high PAPR signal waveform, to ensure that the multi-tone signal does not become a common equal-amplitude signal to a low PAPR signal. Therefore, the receive end keeps relatively high power conversion efficiency. The phase-modulated signal is used to adjust a phase of the high PAPR signal, and combine control information into a phase change, to control a working status of the receive end, enable the receive end to be charged better, and increase direct current power output by the receive end.

Embodiment 1 of a Receive End:

Based on the remote wireless charging transmit end provided in the foregoing embodiments, an embodiment of this application further provides a remote wireless charging receive end. The receive end is wirelessly charged based on a composite signal sent by the transmit end. The following describes in detail a working principle of the receive end with reference to accompanying drawings.

Figure 15:
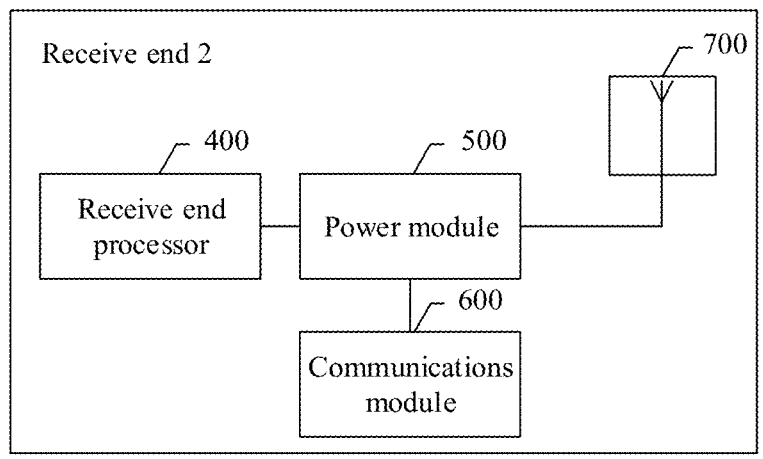
FIG. 15 is a schematic diagram of a remote wireless charging receive end according to an embodiment of this application.

FIG. 15 is a schematic diagram of a remote wireless charging receive end based on this embodiment of this application.

A receive end 2 provided in this embodiment includes a receive end processor 400, a power module 500, a communications module 600, and a receive end antenna 700.

The receive end antenna 700 is configured to receive a radio frequency signal transmitted by a transmit end 1. The radio frequency signal is a composite signal generated by the transmit end based on a control signal and a power signal.

The receive end antenna 700 transmits the received radio frequency signal to the power module 500 and the communications module 600.

A sequence in which the receive end antenna 700 transmits a signal is not limited in this embodiment. For example, the receive end antenna 700 may first transmit the radio frequency signal to the power module 500, and then transmit the radio frequency signal to the communications module 600. Alternatively, the receive end antenna 700 may first transmit the radio frequency signal to the communications module 600, and then transmit the radio frequency signal to the power module 500. Alternatively, the receive end antenna 700 may simultaneously transmit the radio frequency signal to the power module 500 and the communications module 600.

The power module 500 is configured to convert the composite signal into energy for storage, to supply power to the receive end processor 400 and the communications module 600.

Figure 16:
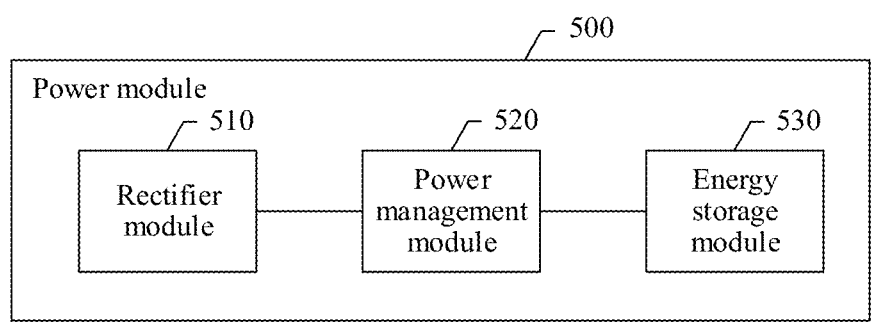
FIG. 16 is a schematic diagram of a power module according to an embodiment.

The following describes a specific implementation form of the power module 500 with reference to an accompanying drawing. FIG. 16 is a schematic diagram of a power module according to this embodiment.

The power module 500 includes a rectifier module 510, a power management module 520, and an energy storage module 530.

The rectifier module 510 converts, into a direct current source, the radio frequency signal received from the receive end antenna 700, and sends the direct current source to the power management module 520. The power management module 520 forms a voltage stabilization source based on the direct current source, and stores obtained energy in the energy storage module 530. The energy storage module 530 provides electric energy to the receive end processor 400 and the communications module 600.

The communications module 600 is configured to: demodulate the composite signal into a control signal, and send the control signal to the receive end processor 400.

The following describes a structure of the communications module 600 by using an example in which the receive end cannot send a feedback signal to the transmit end.

Figure 17:
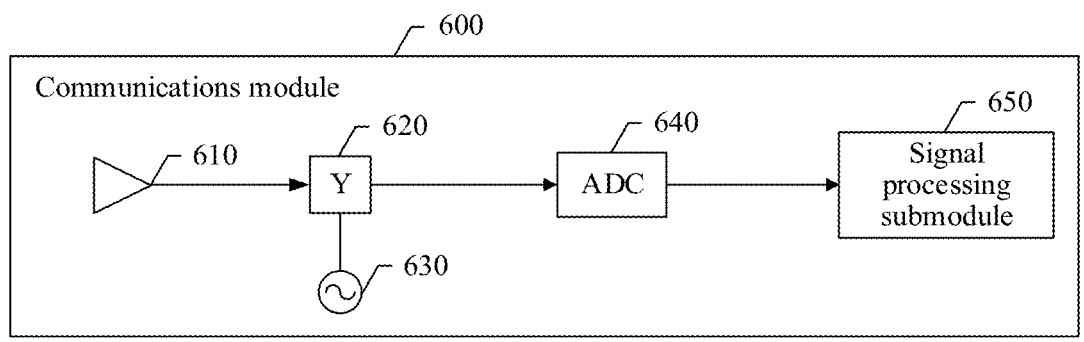
FIG. 17 is a schematic diagram of a communications module according to an embodiment.

FIG. 17 is a schematic diagram of a communications module according to this embodiment.

When the receive end does not need a function of sending the feedback signal to the transmit end, the receive end only needs to have a signal receiving path. The communications module 600 includes a power amplifier 610, a mixer 620, an oscillator 630, an ADC 640, and a signal processing submodule 650.

The signal processing submodule 650 is not limited in this embodiment. For example, the signal processing submodule 650 may be a single-chip microcomputer or a microprocessor.

The following describes the structure of the communications module by using an example in which the receive end can send the feedback signal to the transmit end.

Figure 18:
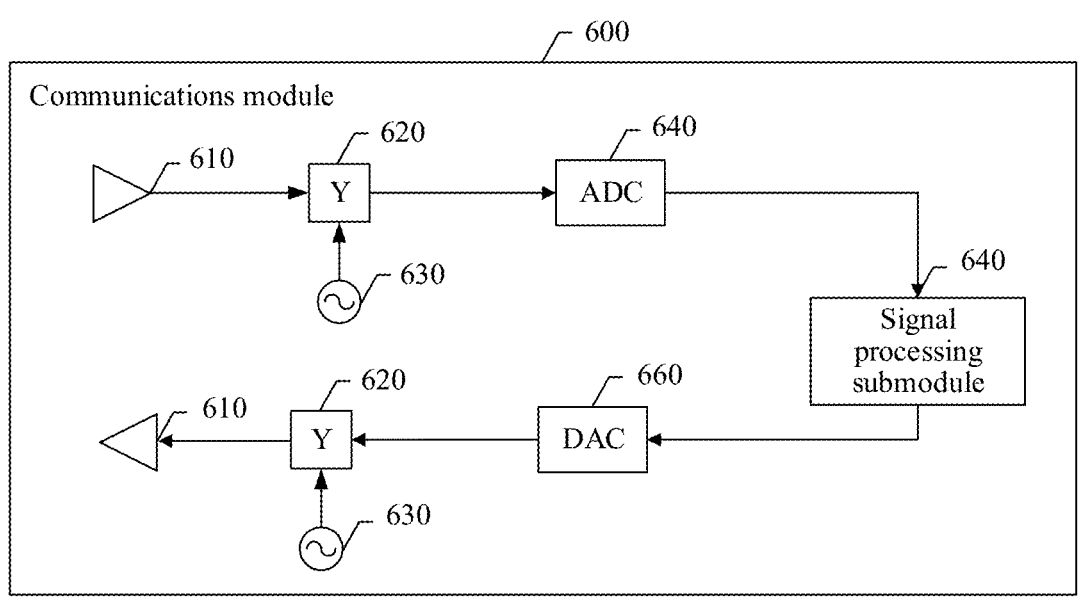
FIG. 18 is a schematic diagram of another communications module according to an embodiment.

FIG. 18 is a schematic diagram of another communications module according to this embodiment.

When the receive end needs to send the feedback signal to the transmit end, the receive end further needs to receive the radio frequency signal sent by the transmit end. The communications module 600 includes two signal transmission paths that are respectively a communication sending path and a communication receiving path. The communication receiving path includes a power amplifier 610, a mixer 620, an oscillator 630, and an ADC 640. The communication sending path includes a power amplifier 610, a mixer 620, an oscillator 630, and a DAC 660. The two paths are connected by using a signal processing submodule 650.

The receive end processor 400 is configured to control a working status of the receive end 2 based on the control signal.

The receive end processor 400 is configured to control the working status of the receive end 2 based on the control signal sent by the communications module 600. For example, if the control signal is to control the receive end 2 to be powered on, the receive end processor 400 controls the receive end 2 to be powered on.

A connection manner of the receive end processor 400 is not specifically limited in this embodiment. For example, the receive end processor 400 is connected to the power module 500 and the communications module 600 in an unchangeable connection manner (for example, through a wire). Alternatively, the receive end processor 400 is connected to the power module 500 and the communications module 600 in a changeable connection manner (for example, in a connection manner of inserting the receive end processor 400 into an interface or removing the receive end processor 400 from the interface).

The remote wireless charging receive end provided in this embodiment includes a receive end antenna, a power module, a communications module, and a receive end processor. The receive end antenna obtains the composite signal through a composite signal transmission path, the power module converts the composite signal into energy for storage, to provide electric energy for the communications module and the receive end processor, and the communications module obtains the control signal from the composite signal, so that the receive end processor controls the working status of the receive end based on the control signal.

Embodiment 2 of a Receive End:

An embodiment provides a remote wireless charging receive end. The receive end not only can receive a composite signal sent by a transmit end, to be wirelessly charged, but also can send a feedback signal to the transmit end, so that the transmit end adjusts the composite signal based on the feedback signal, to meet a continuously changing requirement of the receive end.

The following describes this embodiment provided in this application in detail with reference to accompanying drawings.

Figure 19:
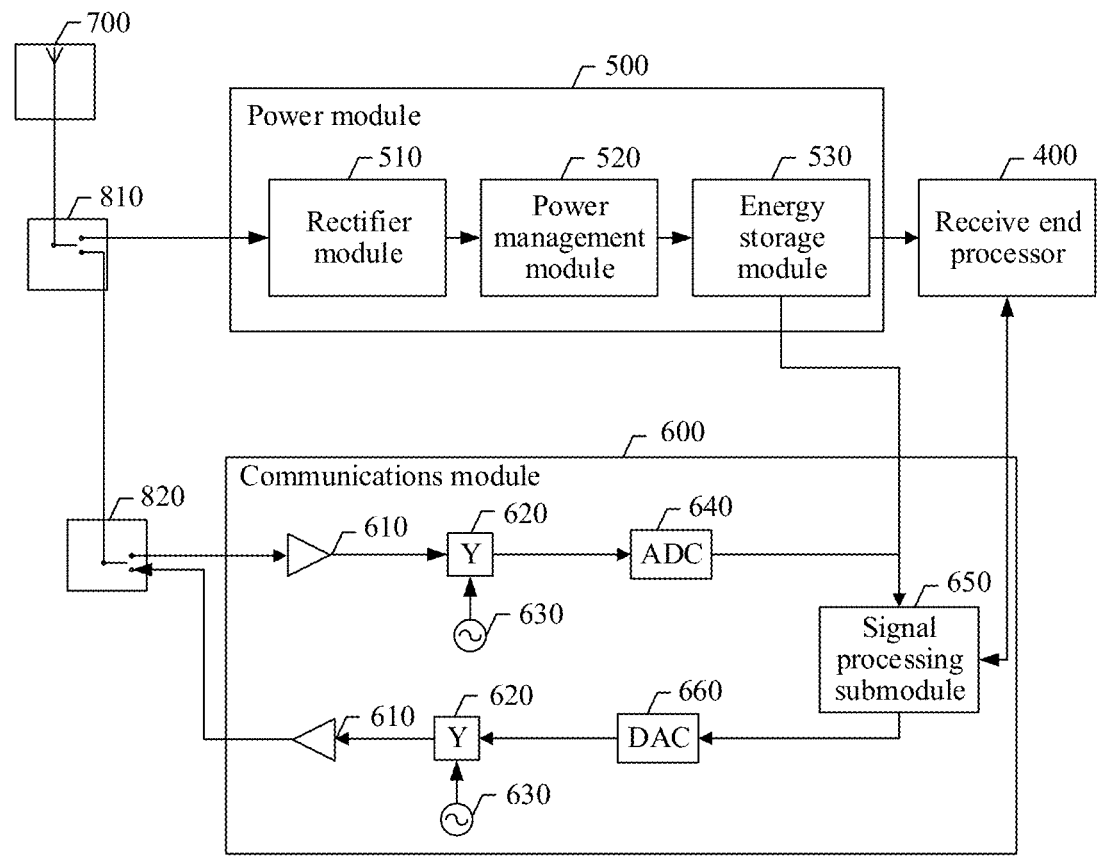
FIG. 19 is a schematic diagram of another wireless charging receive end according to an embodiment.

FIG. 19 is a schematic diagram of another wireless charging receive end according to this embodiment.

A receive end 2 includes a receive end processor 400, a receive end antenna 700, a second switching switch 810, and a third switching switch 820. A power module 500 is in a form shown in FIG. 16. Because the receive end can send a feedback signal to a transmit end, a communications module 600 is in a form shown in FIG. 18.

A first end of the second switching switch 810 is connected to a receive antenna 700. The communications module 600 includes a communication sending path and a communication receiving path.

One antenna is used to receive or send the composite signal or the feedback signal, and a quantity of receive end antennas is reduced, to simplify a structure of the receive end, and reduce costs of the receive end.

The following first describes a working principle of receiving the composite signal by the receive end.

A receive end processor 400 first controls a second end of the second switching switch 810 to connect to a first end of the third switching switch 820, controls a second end of the third switching switch 820 to connect to the communication receiving path, and then controls the second end of the second switching switch 810 to connect to the power module.

The receive end antenna 700 receives a radio frequency signal corresponding to the composite signal, then a power amplifier 610 in the communications module 600 amplifies the radio frequency signal, a mixer 620 and an oscillator 630 convert the radio frequency signal into a fundamental frequency signal, and an ADC 640 converts the fundamental frequency signal into a digital signal, and sends the digital signal to a signal processing submodule 650 for processing.

The signal processing submodule 650 demodulates the composite signal based on a signal corresponding to the composite signal, to obtain a control signal, and sends the control signal to the receive end processor 400. The receive end processor 400 controls a working status of the receive end based on the control signal.

A demodulation method performed by the signal processing submodule 650 is not limited in this embodiment, and may be selected by persons skilled in the art based on an actual requirement.

The working status of the receive end is not limited in this embodiment. For example, a power receiving mode is enabled. The receive end processor 400 controls, based on the control signal, the second end of the second switching switch 810 to connect to the power module 500, so that an energy storage module in the power module 500 stores energy, to provide electric energy for the signal processing submodule 650 and the receive end processor 400. For another example, the power receiving mode is disabled.

It should be noted that, when the receive end has only one antenna, a charging time is usually relatively long, and a communication time is relatively short. Therefore, a time in which the second end of the second switching switch 810 is connected to the power module 500 may be longer than a time in which the second end of the second switching switch 810 is connected to the communications module 600.

When a requirement of the receive end changes, for example, when a location of the receive end changes, or when battery level information of the receive end changes, the receive end may send the changed information to the transmit end as a feedback signal, so that the transmit end adjusts the composite signal based on the feedback signal, thereby meeting the requirement of the receive end.

The following describes a working principle of transmitting the feedback signal by the receive end.

The receive end processor 400 controls the second end of the second switching switch 810 to connect to the first end of the third switching switch 820, and controls the second end of the third switching switch 820 to connect to the communication sending path.

The receive end processor 400 generates the feedback signal based on a requirement change of the receive end, sends the feedback signal to the signal processing submodule 650, sends the feedback signal to the receive end antenna 700 in a radio frequency form by using the DAC 660, the mixer 620, the oscillator 630, and the power amplifier 610, and sends, to the transmit end by using the receive end antenna 700, a radio frequency signal corresponding to the feedback signal, so that the transmit end adjusts the composite signal based on location information and/or the battery level information carried in the feedback signal, to meet a continuously changing requirement of the receive end.

The receive end antenna and a switching switch may have different combinations based on an actual requirement, and a combination manner is not specifically limited in this embodiment. The following provides descriptions by using two combination manners of the receive end antenna and the switching switch as an example.

Combination Manner 1: Two Antennas and One Switching Switch.

Figure 20:
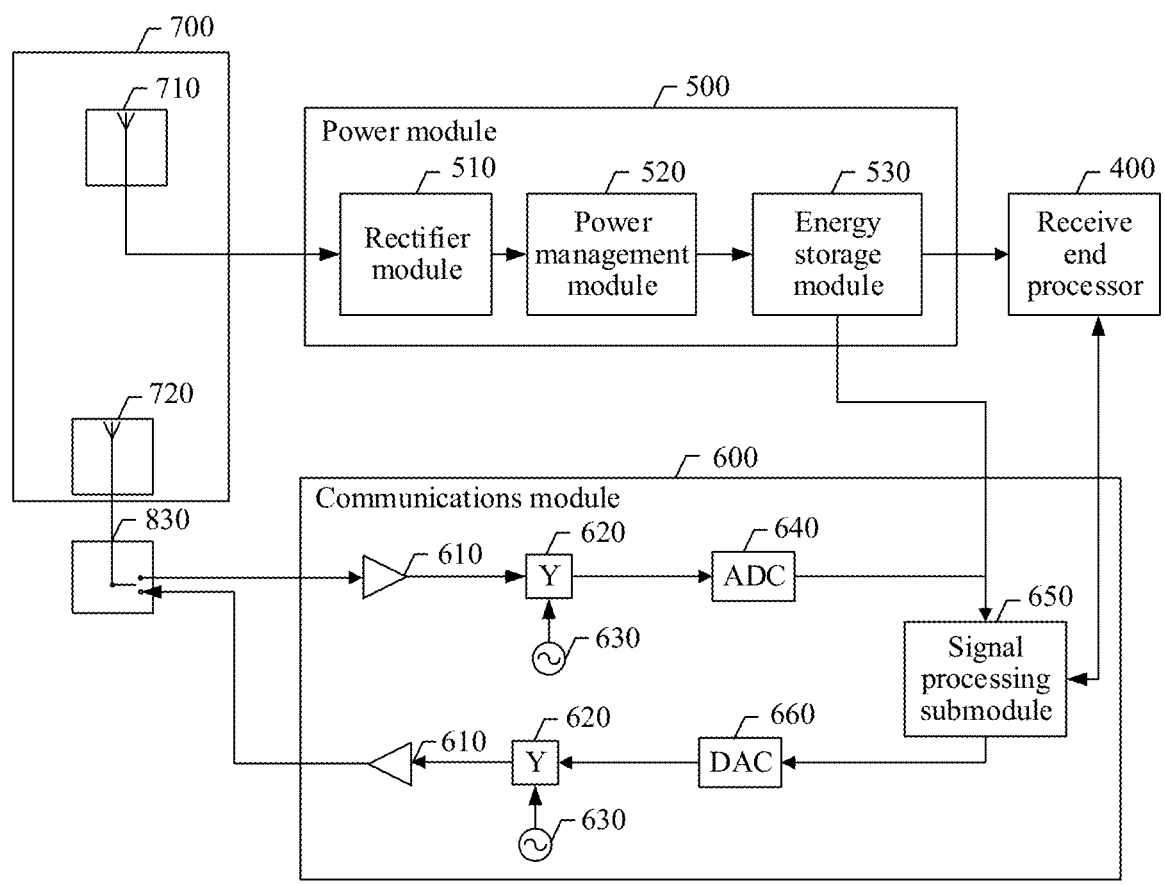
FIG. 20 is a schematic diagram of another wireless charging receive end according to an embodiment.

FIG. 20 is a schematic diagram of another wireless charging receive end according to this embodiment.

A receive end antenna 700 includes a receive end receive antenna 710 and a receive end transceiver antenna 720. The receive end receive antenna 710 is connected to a power module 500, and is configured to: receive a composite signal, and send the composite signal to the power module.

The receive end further includes a fourth switching switch 830, and a first end of the fourth switching switch 830 is connected to the receive end transceiver antenna 720.

The communications module 600 includes a communication sending path and a communication receiving path.

When the receive end transceiver antenna 720 receives the composite signal, the receive end processor 400 controls a second end of the fourth switching switch 830 to connect to the communication receiving path. When the receive end transceiver antenna 720 sends a feedback signal, the receive end processor 400 controls the second end of the fourth switching switch 830 to connect to the communication sending path.

A working principle of the receive end provided in this embodiment is the same as the working principle of the foregoing receive end, and details are not described herein again.

Combination Manner 2: Three Antennas.

Figure 21:
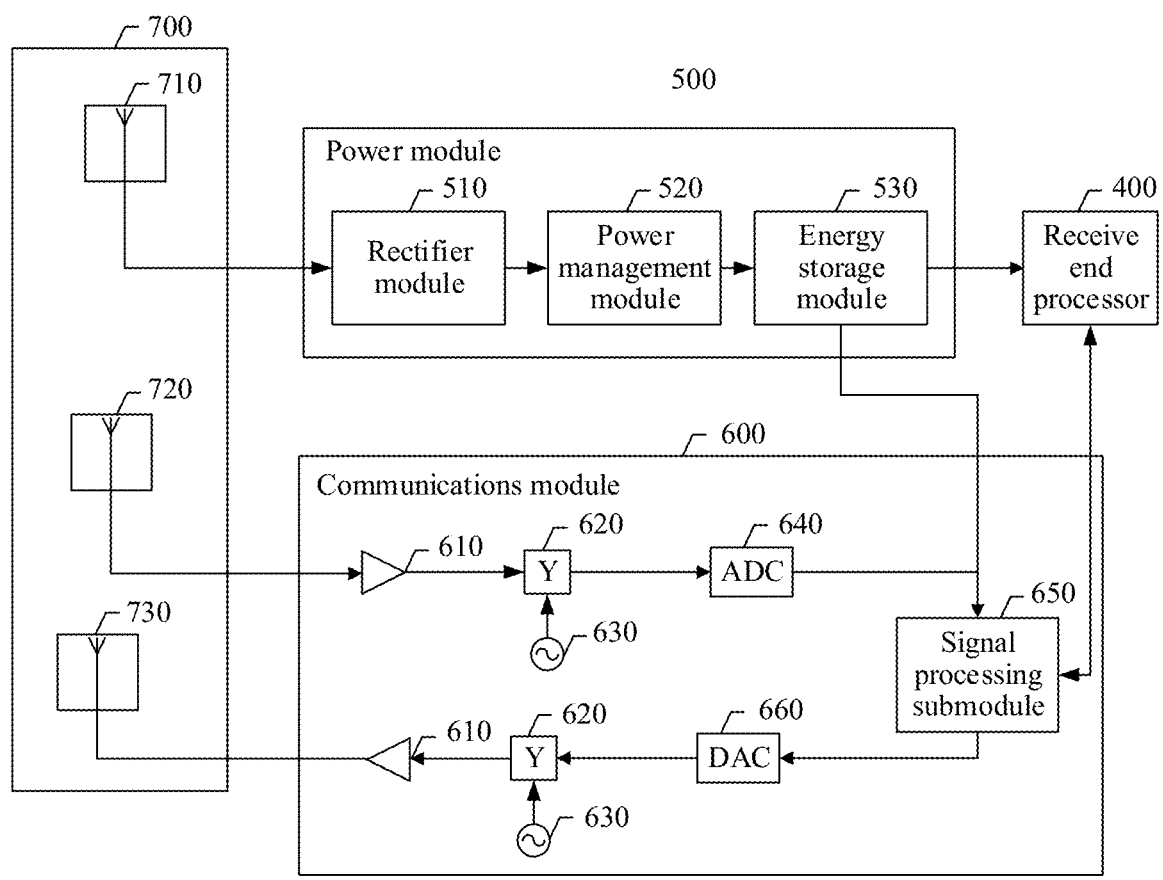
FIG. 21 is a schematic diagram of another wireless charging receive end according to an embodiment.

FIG. 21 is a schematic diagram of another wireless charging receive end according to this embodiment.

A receive end antenna includes a first receive antenna 710, a second receive antenna 720, and a first transmit antenna 730.

The first receive antenna 710 is connected to a power module 500, and is configured to: receive a composite signal, and send the composite signal to the power module 500.

The communications module 600 includes a communication sending path and a communication receiving path.

The second receive antenna 720 is connected to the communication receiving path, and is configured to receive the composite signal. The first transmit antenna 730 is connected to the communication sending path, and is configured to transmit a feedback signal.

Three antennas are used, and a quantity of switches is reduced, so that no control switch needs to be used to switch between switches.

Based on the remote wireless charging receive end provided in this embodiment, when a requirement of the receive end continuously changes, to ensure that the receive end can be charged better, the receive end sends the feedback signal to the transmit end through one feedback signal transmission path, so that the transmit end generates the composite signal based on the feedback signal. The receive end antenna obtains the composite signal through a composite signal transmission path, the power module converts the composite signal into energy for storage, to provide electric energy for the communications module and the receive end processor, and the communications module obtains the control signal from the composite signal, so that the receive end processor controls a working status of the receive end based on the control signal.

Embodiment 3 of a Receive End:

The receive end in Embodiment 2 of a receive end may generate a feedback signal, and send the feedback signal to the transmit end, so that the transmit end adjusts a composite signal based on the feedback signal, to meet a continuously changing requirement of the receive end. For a receive end whose requirement does not change, the receive end does not need to send the feedback signal to the transmit end, and costs may be reduced by using a structure of the receive end.

Figure 22:
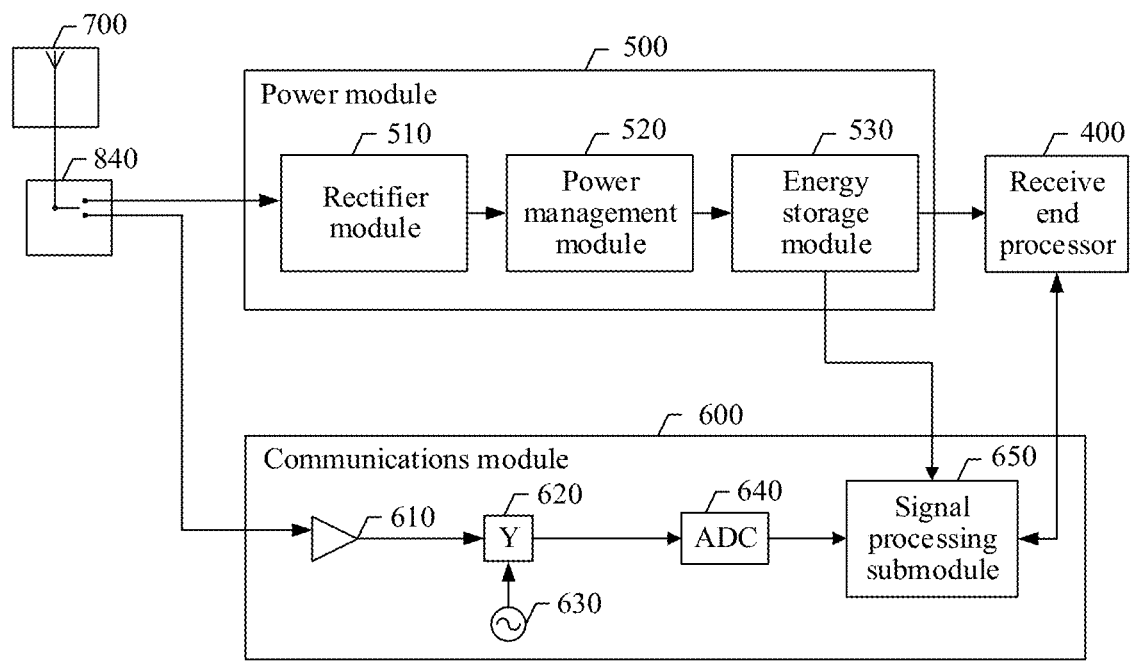
FIG. 22 is a schematic diagram of another wireless charging receive end according to an embodiment.

FIG. 22 is a schematic diagram of another wireless charging receive end according to this embodiment.

A receive end 2 includes a receive end processor 400, a receive end antenna 700, and a fifth switching switch 840. A power module 500 is in a form shown in FIG. 16. Because the receive end does not need to send a feedback signal to a transmit end, a communications module may be in a form shown in FIG. 17.

When the receive end antenna 700 receives a composite signal sent by the transmit end, the receive end processor 400 first controls a second end of the fifth switching switch 840 to connect to the communications module 600, and then controls the second end of the fifth switching switch 840 to connect to the power module 500.

A working principle of the receive end provided in this embodiment is the same as the working principle of the foregoing receive end, and details are not described herein again.

The receive end provided in this embodiment of this application may not only control, by using a switching switch, the receive end antenna to connect to the power module or the communications module, but may also be connected to both the power module and the communications module by using a power splitter.

Figure 23:
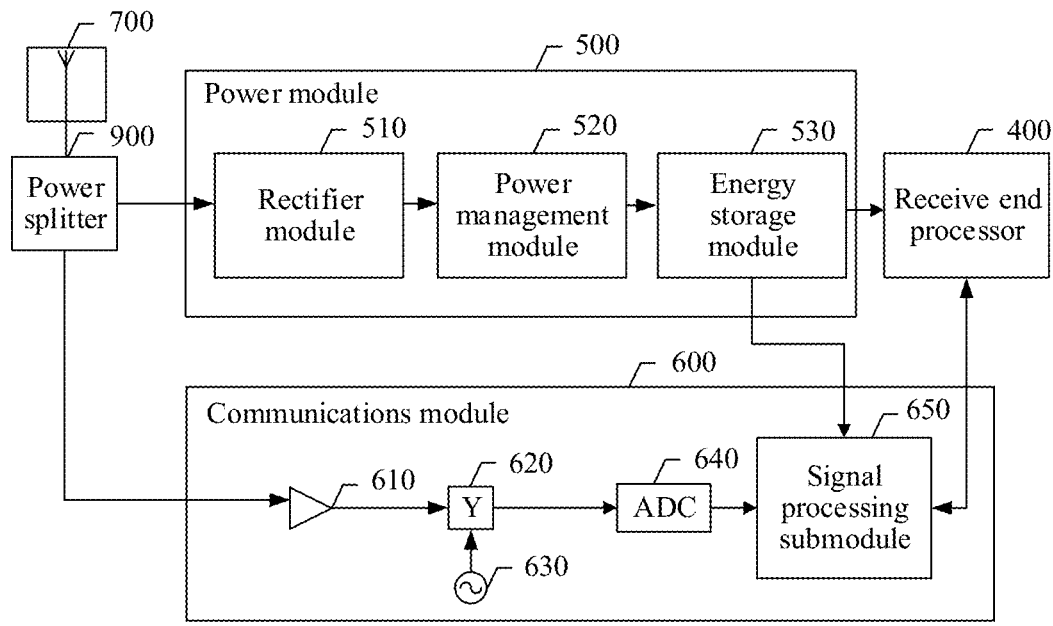
FIG. 23 is a schematic diagram of another wireless charging receive end according to an embodiment.

FIG. 23 is a schematic diagram of another wireless charging receive end according to this embodiment.

The receive end further includes a power splitter 900, a first end of the power splitter 900 is connected to a receive end antenna 700, and a second end of the power splitter 900 is connected to a power module 500 and a communications module 600. The power splitter 900 is configured to divide received composite signals into two parts. Some composite signals are sent to the power module 500, and the other composite signals are sent to the communications module 600.

A ratio of allocating the composite signals by the power splitter is not specifically limited in this embodiment. For example, the composite signals are allocated at a ratio of 1:1 or a ratio of n:1. Herein, n is any natural number. To store more electric energy, more composite signals may be allocated to the power module, and less composite signals may be allocated to the communications module.

A working principle of the receive end provided in this embodiment is the same as the working principle of the foregoing receive end, and details are not described herein again.

The receive end provided in this embodiment of this application may alternatively be connected to both the power module and the communications module by using two antennas.

Figure 24:
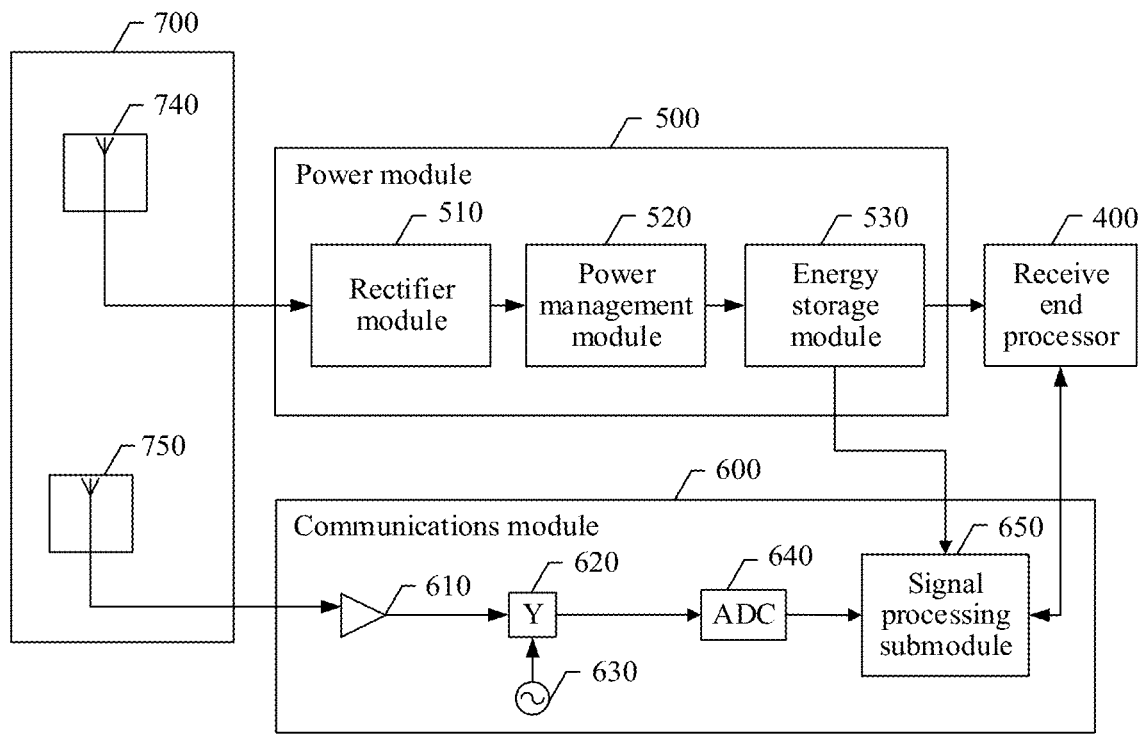
FIG. 24 is a schematic diagram of another wireless charging receive end according to an embodiment.

FIG. 24 shows another wireless charging receive end according to this embodiment.

A receive end antenna 700 includes a third receive antenna 740 and a fourth receive antenna 750. The third receive antenna 740 is connected to a power module 500, and is configured to receive a composite signal. The fourth receive antenna 750 is connected to a communications module 600, and is configured to receive a composite signal.

The third receive antenna 740 and the fourth receive antenna 750 operate simultaneously, the third receive antenna 740 receives some composite signals, and the fourth receive antenna 750 receives some composite signals.

A ratio of composite signals allocated to the third receive antenna to composite signals allocated to the fourth receive antenna is not specifically limited in this embodiment. For example, the composite signals are allocated at a ratio of 1:1 or a ratio of n:1. Herein, n is any natural number. To store more electric energy, more composite signals may be allocated to the power module, and less composite signals may be allocated to the communications module.

A working principle of the receive end provided in this embodiment is the same as the working principle of the foregoing receive end, and details are not described herein again.

The remote wireless charging receive end provided in this embodiment obtains the composite signal through a composite signal transmission path, the power module converts the composite signal into energy for storage, to provide electric energy for the communications module and the receive end processor, and the communications module obtains a control signal from the composite signal, so that the receive end processor controls a working status of the receive end based on the control signal. Therefore, compared with the receive end provided in Embodiment 2 of a receive end, the receive end provided in this embodiment does not have a communication sending path, thereby simplifying a structure of the receive end and reducing costs of the receive end.

Embodiment of a Wireless Charging System:

Based on the transmit end and the receive end provided in the foregoing embodiments, this application further provides a wireless charging system, including the transmit end and the receive end described in the foregoing embodiments.

Figure 25:
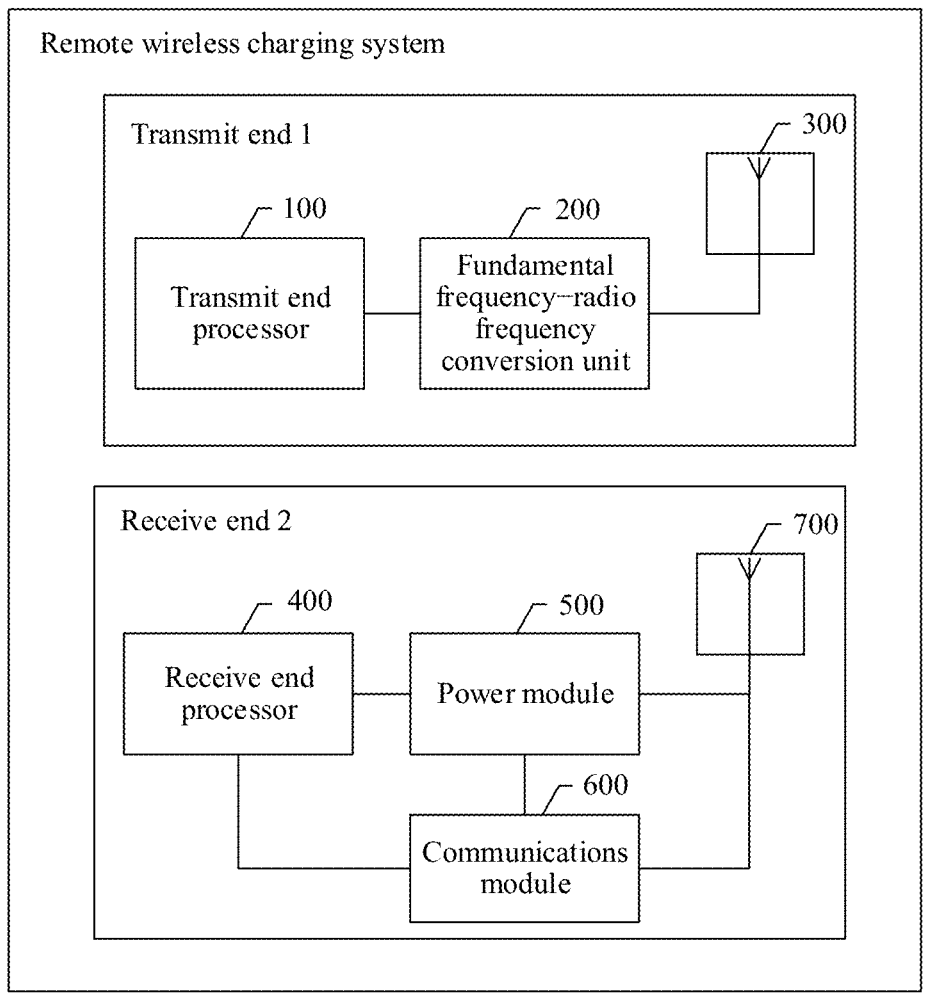
FIG. 25 is a schematic diagram of a remote wireless charging system according to an embodiment.

FIG. 25 is a schematic diagram of a remote wireless charging system according to this embodiment.

The wireless charging system includes a transmit end 1 and a receive end 2, and the transmit end 1 is configured to wirelessly charge the receive end 2.

A working principle of the transmit end and a working principle of the receive end provided in this embodiment are the same as those in the foregoing embodiments, and details are not described herein again.

The transmit end 1 and the receive end 2 may perform wireless charging through in-band communication. The receive end may be one or more of an intelligent communications terminal, a wearable device, a sensor, or an intelligent battery device.

To better charge the receive end, the following provides descriptions by using an example in which the receive end of the wireless charging system can transmit a feedback signal to the transmit end.

The wireless charging system has different control policies based on different combinations of the transmit end and the receive end. The wireless charging system includes working statuses in three stages: (a) composite signal generation stage; (b) communication stage; and (c) charging stage.

The following separately provides descriptions based on different combinations of the transmit end and the receive end.

Combination 1: The remote wireless charging system provided in this embodiment includes the transmit end in FIG. 13 and the receive end in FIG. 19.

The wireless charging system enters (a) composite signal generation stage. A second end of a second switching switch 810 of the receive end 2 is connected to a first end of a third switching switch 820, a second end of the third switching switch 820 is connected to a communication sending path, and the receive end 2 transmits the feedback signal to the transmit end 1. A second end of a first switching switch 490 of the transmit end 1 is connected to a signal receiving path, a transmit end processor 100 generates a corresponding composite signal based on the feedback signal, and the second end of the first switching switch 490 is connected to a signal sending path.

The wireless charging system enters (b) communication stage. The receive end 2 receives the composite signal through a receive end antenna 700, the second end of the second switching switch 810 of the receive end 2 is connected to the first end of the third switching switch 820, and the second end of the third switching switch 820 is connected to a communication receive end path. A communications module 600 obtains a control signal from the composite signal, and the control signal is used by a receive end processor 400 to control a working status of the receive end.

The wireless charging system enters (c) charging stage. The transmit end 1 keeps a composite signal transmitting state, the second end of the second switching switch of the receive end 2 is connected to the power module 500, and a power module 500 converts the composite signal into energy for storage, to supply power to the communications module 600 and the receive end processor 400.

Combination 2: The remote wireless charging system provided in this embodiment includes the transmit end in FIG. 13 and the receive end in FIG. 20.

The wireless charging system enters (a) composite signal generation stage. A second end of a fourth switching switch 830 of the receive end 2 is connected to a communication sending path in the communications module 600, and the receive end 2 transmits a feedback signal to the transmit end 1. In this case, a receive end receive antenna 710 and/or a power module 500 do/does not work. A second end of a first switching switch 490 of the transmit end 1 is connected to a signal receiving path, a transmit end processor 100 generates a corresponding composite signal based on the feedback signal, and the second end of the first switching switch 490 is connected to a signal sending path.

The wireless charging system may simultaneously enter (b) communication stage and (c) charging stage. The receive end 2 receives some composite signals through a receive end transceiver antenna 720, a second end of a fourth switching switch 830 of the receive end 2 is connected to a communication receive end path in a communications module 600, and the communications module 600 obtains a control signal from the composite signal, to control the receive end processor 400. The receive end 2 receives some composite signals through a receive end receive antenna 710, and a power module 500 converts the composite signal into energy for storage, to supply power to the communications module 600 and the receive end processor 400.

A ratio of composite signals received by the receive end transceiver antenna 720 to composite signals received by the receive end receive antenna 710 is determined by gains of respective antennas, and a ratio of allocating composite signals is not specifically limited in this embodiment.

Combination 3: The remote wireless charging system provided in this embodiment includes the transmit end in FIG. 13 and the receive end in FIG. 21.

The wireless charging system enters (a) composite signal generation stage. A first transmit antenna 730 of the receive end 2 works, and a receive end receive antenna 710 and a receive end transceiver antenna 720 do not work. A communications module 600 transmits a feedback signal to the transmit end 1 through the first transmit antenna 730. A second end of a first switching switch 490 of the transmit end 1 is connected to a signal receiving path, a transmit end processor 100 generates a corresponding composite signal based on the feedback signal, and a second end of a first switching switch 490 is connected to a signal sending path.

The wireless charging system may simultaneously enter (b) communication stage and (c) charging stage. The first transmit antenna 730 of the receive end 2 does not work, and the receive end receive antenna 710 and the receive end transceiver antenna 720 work. The receive end receive antenna 710 receives some composite signals, and a power module 500 converts the composite signal into energy for storage, to supply power to a communications module 600 and a receive end processor 400. The receive end transceiver antenna 720 receives some composite signals, and the communications module 600 obtains a control signal from the composite signal, to control the receive end processor 400.

A ratio of composite signals received by the receive end transceiver antenna 720 to composite signals received by the receive end receive antenna 710 is determined by gains of respective antennas, and a ratio of allocating composite signals is not specifically limited in this embodiment.

Combination 4: The remote wireless charging system provided in this embodiment includes the transmit end in FIG. 14 and the receive end in FIG. 19.

The wireless charging system enters (a) composite signal generation stage. A second end of a second switching switch 810 of the receive end 2 is connected to a first end of a third switching switch 820, a second end of the third switching switch 820 is connected to a communication sending path, and the receive end 2 transmits a feedback signal to the transmit end 1. A transmit end receive antenna 320 receives the feedback signal, a transmit end transmit antenna 310 does not work, and a transmit end processor 100 generates a corresponding composite signal based on the feedback signal.

The wireless charging system enters (b) communication stage. The transmit end transmit antenna 310 transmits a radio frequency signal corresponding to the composite signal, the transmit end receive antenna 320 does not work, the receive end 2 receives the composite signal through a receive end antenna 700, the second end of the second switching switch 810 of the receive end 2 is connected to the first end of the third switching switch 820, the second end of the third switching switch 820 is connected to a communication receive end path, and a communications module 600 obtains a control signal from the composite signal, to control a receive end processor 400.

The wireless charging system enters (c) charging stage. The transmit end transmit antenna 310 keeps a composite signal transmitting state, the second end of the second switching switch of the receive end 2 is connected to the power module 500, and the power module 500 converts the composite signal into energy for storage, to supply power to the communications module 600 and the receive end processor 400.

Combination 5: The remote wireless charging system provided in this embodiment includes the transmit end in FIG. 14 and the receive end in FIG. 20.

The wireless charging system enters (a) composite signal generation stage. A second end of a fourth switching switch 830 of the receive end 2 is connected to a communication transmission path in the communications module 600, and the receive end 2 transmits a feedback signal to the transmit end 1. In this case, a receive end receive antenna 710 and/or a power module 500 do/does not work. A transmit end receive antenna 320 receives the feedback signal, a transmit end transmit antenna 310 does not work, and a transmit end processor 100 generates a corresponding composite signal based on the feedback signal.

The wireless charging system may simultaneously enter (b) communication stage and (c) charging stage. The transmit end transmit antenna 310 transmits a radio frequency signal corresponding to the composite signal, and the transmit end receive antenna 320 does not work. The receive end 2 receives some composite signals through a receive end transceiver antenna 720, the second end of the fourth switching switch 830 of the receive end 2 is connected to a communication receive end path in the communications module 600, and the communications module 600 obtains a control signal from the composite signal, to control a receive end processor 400. The receive end 2 receives some composite signals through the receive end receive antenna 710, and the power module 500 converts the composite signal into energy for storage, to supply power to the communications module 600 and the receive end processor 400.

A ratio of composite signals received by the receive end transceiver antenna 720 to composite signals received by the receive end receive antenna 710 is determined by gains of respective antennas, and a ratio of allocating composite signals is not specifically limited in this embodiment.

Combination 6: The remote wireless charging system provided in this embodiment includes the transmit end in FIG. 14 and the receive end in FIG. 21.

The wireless charging system enters (a) composite signal generation stage 00. A first transmit antenna 730 of the receive end 2 works, and a receive end receive antenna 710 and a receive end transceiver antenna 720 do not work. A communications module 600 transmits a feedback signal to the transmit end 1 through the first transmit antenna 730. A transmit end receive antenna 320 receives the feedback signal, a transmit end transmit antenna 310 does not work, and a transmit end processor 100 generates a corresponding composite signal based on the feedback signal.

The wireless charging system may simultaneously enter (b) communication stage and (c) charging stage. The transmit end transmit antenna 310 transmits a radio frequency signal corresponding to the composite signal, and the transmit end receive antenna 320 does not work. The first transmit antenna 730 of the receive end 2 does not work, and the receive end receive antenna 710 and the receive end transceiver antenna 720 work. The receive end receive antenna 710 receives some composite signals, and a power module 500 converts the composite signal into energy for storage, to supply power to the communications module 600 and a receive end processor 400. The receive end transceiver antenna 720 receives some composite signals, the communications module 600 obtains a control signal from the composite signal, and the receive end processor 400 controls a working status of the receive end based on the control signal.

A ratio of composite signals received by the receive end transceiver antenna 720 to composite signals received by the receive end receive antenna 710 is determined by gains of respective antennas, and a ratio of allocating composite signals is not specifically limited in this embodiment.

To simplify a structure of the wireless charging system and reduce costs of the wireless charging system, the following provides descriptions by using an example in which the receive end of the wireless charging system cannot transmit the feedback signal to the transmit end.

The wireless charging system has different control policies based on different combinations of the transmit end and the receive end. The wireless charging system includes working statuses in two stages: (a) communication stage; and (b) charging stage.

The following separately provides descriptions based on different combinations of the transmit end and the receive end.

Combination 1: The remote wireless charging system provided in this embodiment includes the transmit end in FIG. 8 and the receive end in FIG. 22.

The wireless charging system is controlled by a fifth switching switch 840 to enter (a) communication stage or (b)

charging stage. A second end of the fifth switching switch 840 is connected to a communications module 600, and the wireless charging system enters (a) communication stage. The second end of the fifth switching switch 840 is connected to a power module 500, and the wireless charging system enters (b) charging stage.

Combination 2: The remote wireless charging system provided in this embodiment includes the transmit end in FIG. 8 and the receive end in FIG. 23.

The wireless charging system may simultaneously enter (a) communication stage and (b) charging stage. A power splitter 900 allocates composite signals to a communications module 600 and a power module 500 at different ratios.

A ratio of composite signals received by the communications module 600 to composite signals received by the power module 500 is determined by gains of respective antennas, and a ratio of allocating composite signals is not specifically limited in this embodiment.

Combination 3: The remote wireless charging system provided in this embodiment includes the transmit end in FIG. 8 and the receive end in FIG. 24.

The wireless charging system may simultaneously enter (a) communication stage and (b) charging stage. A power splitter 900 allocates composite signals to a communications module 600 and a power module 500 at different allocation ratios.

A ratio of composite signals received by the communications module 600 to composite signals received by the power module 500 is determined by gains of respective antennas, and a ratio of allocating composite signal is not specifically limited in this embodiment.

The remote wireless charging system provided in this embodiment includes the transmit end and the receive end, and the transmit end wirelessly charges the receive end. The transmit end transmits only one composite signal. The composite signal is generated by the transmit end processor based on the control signal and the power signal. To be specific, the control signal and the power signal are combined, so that a signal transmission path can be simplified. The fundamental frequency-radio frequency conversion unit converts the composite signal into the radio frequency signal, and the transmit end antenna transmits the radio frequency signal corresponding to the composite signal.

The transmit end transmits only one signal, and there is no separate power signal or separate control signal. Therefore, the transmit end does not need to include a communications module or a power module that are separated from each other, to transmit the control signal by using the communications module, and to transmit the power signal by using the power module. In other words, two independent signal transmission paths are not required. Because the transmit end generates and transmits only one composite signal, it only needs to be ensured that there is a composite signal transmission path inside the transmit end. Therefore, the remote wireless charging system provided in this embodiment of this application may implement functions of wirelessly charging and controlling the receive end by using one composite signal transmission path. An internal hardware structure of the wireless charging system is simplified, and costs of the entire wireless charging system are reduced.

It should be understood that in this application, "at least one piece (item)" means one or more, and "a plurality of" means two or more. Herein, "and/or" is used to describe an association relationship between associated objects, and indicates that three relationships may exist. For example, "A and/or B" may indicate that only A exists, only B exists, and both A and B exist. Herein, A and B may be singular or plural. The character "/" usually indicates an "or" relationship between the associated objects. Herein, "at least one item (piece) of the following" or similar expressions thereof means any combination of these items, including any combination of a single item (piece) or a plurality of items (pieces). For example, at least one item (piece) of a, b, or c may represent a, b, c, "a and b", "a and c", "b and c", or "a, b, and c". Herein, a, b, and c may be singular or plural.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A remote wireless charging transmit end configured to wirelessly charge a receive end, the transmit end comprising:
    a transmit end processor configured to generate a composite signal based on a control signal and a power signal, and send the composite signal to a fundamental frequency-radio frequency conversion unit, wherein the control signal is used to control a working status of the receive end, and the power signal is used to charge the receive end, wherein the transmit end processor is further configured to: generate a phase-modulated signal based on the control signal, and generate the composite signal based on the phase-modulated signal;
    the fundamental frequency-radio frequency conversion unit configured to convert the composite signal into a radio frequency signal, and send the radio frequency signal to a transmit end antenna; and
    the transmit end antenna configured to transmit the radio frequency signal corresponding to the composite signal.

2. The transmit end according to claim 1, wherein the transmit end antenna is further configured to receive a feedback signal transmitted by the receive end, and send the feedback signal to the fundamental frequency-radio frequency conversion unit;
    the fundamental frequency-radio frequency conversion unit is further configured to convert the feedback signal into a fundamental frequency signal, and send the fundamental frequency signal to the transmit end processor.

3. The transmit end according to claim 2, wherein the feedback signal carries at least one of location information of the receive end or battery level information of the receive end; and
    the transmit end processor is further configured to perform at least one of adjusting the power signal in response to determining, based on the location information, that a location of the receive end changes, or adjusting the control signal and the power signal based on the battery level information.

4. The transmit end according to claim 3, wherein the transmit end processor is further configured to: generate a high peak-to-average power ratio (PAPR) waveform based on a communication bandwidth and the power signal, and generate the composite signal based on the phase-modulated signal and the high PAPR waveform.

5. The transmit end according to claim 4, wherein the transmit end processor is configured to generate the high PAPR waveform of a multi-tone signal based on the communication bandwidth, a quantity of tones, and the power signal.

6. The transmit end according to claim 4, wherein the transmit end processor is further configured to adjust the high PAPR waveform based on the feedback signal.

7. The transmit end according to claim 2, wherein the transmit end further comprises a first switching switch;
   wherein the fundamental frequency-radio frequency conversion unit comprises a signal sending path and a signal receiving path;
   wherein a first end of the first switching switch is connected to the transmit end antenna; and
   wherein the transmit end processor is configured to control a second end of the first switching switch to connect to the signal sending path, to send the composite signal, and is further configured to control the second end of the first switching switch to connect to the signal receiving path, to receive the feedback signal.

8. The transmit end according to claim 2, wherein the transmit end antenna comprises a transmit end transmit antenna and a transmit end receive antenna;
   wherein the fundamental frequency-radio frequency conversion unit comprises a signal sending path and a signal receiving path;
   wherein the transmit end transmit antenna is connected to the signal sending path, and the transmit end transmit antenna is configured to transmit the composite signal; and
   wherein the transmit end receive antenna is connected to the signal receiving path, and the transmit end receive antenna is configured to receive the feedback signal.

9. A remote wireless charging receive end, comprising:
   a receive end antenna configured to receive a radio frequency signal transmitted by a transmit end, wherein the radio frequency signal is a composite signal generated by the transmit end based on a control signal, a power signal and a phase-modulated signal generated based on the control signal;
   a receive end processor configured to control a working status of the receive end based on the control signal;
   a communications module configured to obtain the control signal from the composite signal, and send the control signal to the receive end processor; and
   a power module configured to convert the composite signal into energy for storage, to supply power to the receive end processor and the communications module.

10. The receive end according to claim 9, wherein the receive end processor is further configured to send a feedback signal to the communications module, wherein the feedback signal carries at least one of location information of the receive end or battery level information of the receive end;
    the communications module is further configured to: convert the feedback signal into a radio frequency signal, and send the radio frequency signal to the receive end antenna.

11. The receive end according to claim 10, wherein the receive end antenna is further configured to transmit the radio frequency signal corresponding to the feedback signal, so that the transmit end adjusts the control signal and the power signal based on at least one of the location information of the receive end or the battery level information.

12. The receive end according to claim 9, wherein the receive end further comprises a second switching switch and a third switching switch, wherein the communications module comprises a communication sending path and a communication receiving path;
wherein a first end of the second switching switch is connected to the receive end antenna; and
wherein the receive end processor is configured to: to receive the composite signal, first control a second end of the second switching switch to connect to a first end of the third switching switch, control a second end of the third switching switch to connect to the communication receiving path, and then control the second end of the second switching switch to connect to the power module.

13. The receive end according to claim 11, wherein the receive end further comprises a second switching switch and a third switching switch;
    wherein the communications module comprises a communication sending path and a communication receiving path;
    wherein a first end of the second switching switch is connected to the receive end antenna; and
    wherein the receive end processor is configured to: to send the feedback signal, control a second end of the second switching switch to connect to a first end of the third switching switch, and control a second end of the third switching switch to connect to the communication sending path.

14. The receive end according to claim 11, wherein the receive end antenna comprises a receive end receive antenna and a receive end transceiver antenna;
    wherein the receive end receive antenna is connected to the power module, and the receive end receive antenna is configured to receive the composite signal;
    wherein the receive end further comprises a fourth switching switch, and a first end of the fourth switching switch is connected to the receive end transceiver antenna;
    wherein the communications module comprises a communication sending path and a communication receiving path; and
    wherein the receive end processor is configured to control a second end of the fourth switching switch to connect to the communication receiving path, to receive the composite signal, and is configured to control the second end of the fourth switching switch to connect to the communication sending path, to send the feedback signal.

15. The receive end according to claim 9, wherein the receive end antenna comprises a first receive antenna, a second receive antenna, and a first transmit antenna;
    wherein the first receive antenna is connected to the power module, and the first receive antenna is configured to receive the composite signal;
    wherein the communications module comprises a communication sending path and a communication receiving path;
    wherein the second receive antenna is connected to the communication receiving path, and is configured to receive the composite signal; and
    wherein the first transmit antenna is connected to the communication sending path, and is configured to send the feedback signal.

16. The receive end according to claim 9, wherein the receive end further comprises a fifth switching switch;
    wherein a first end of the fifth switching switch is connected to the receive end antenna; and
    wherein the receive end processor is configured to: first control a second end of the fifth switching switch to connect to the communications module, and then control the second end of the fifth switching switch to connect to the power module, to receive the composite signal.

17. The receive end according to claim 9, wherein the receive end further comprises a power splitter; and
wherein a first end of the power splitter is connected to the receive end antenna, wherein a second end of the power splitter is connected to the power module and the communications module, and wherein the power splitter is configured to divide received composite signals into two parts, and send the two parts to the power module and the communications module respectively.

18. The receive end according to claim 9, wherein the receive end antenna comprises a third receive antenna and a fourth receive antenna;
wherein the third receive antenna is connected to the power module, and the third receive antenna is configured to receive the composite signal; and
wherein the fourth receive antenna is connected to the communications module, and the fourth receive antenna is configured to receive the composite signal.

19. A remote wireless charging system, comprising
a transmit end configured to wirelessly charge a receive end, the transmit end comprising:
a transmit end processor configured to generate a composite signal based on a control signal and a power signal, and send the composite signal to a fundamental frequency-radio frequency conversion unit, wherein the control signal is used to control a working status of the receive end, and the power signal is used to charge the receive end, wherein the transmit end processor is further configured to: generate a phase-modulated signal based on the control signal, and generate the composite signal based on the phase-modulated signal;
the fundamental frequency-radio frequency conversion unit configured to convert the composite signal into a radio frequency signal, and send the radio frequency signal to a transmit end antenna; and
the transmit end antenna configured to transmit the radio frequency signal corresponding to the composite signal; and
a receive end comprising
a receive end antenna configured to receive a radio frequency signal transmitted by a transmit end, wherein the radio frequency signal is a composite signal generated by the transmit end based on a control signal and a power signal;
a receive end processor configured to control a working status of the receive end based on the control signal;
a communications module configured to obtain the control signal from the composite signal, and send the control signal to the receive end processor; and
a power module configured to convert the composite signal into energy for storage, to supply power to the receive end processor and the communications module, wherein the transmit end is configured to wirelessly charge the receive end.

20. The system according to claim 19, wherein the transmit end and the receive end perform wireless communication through in-band communication.

* * * * *